US011968635B2

(12) United States Patent
Sengupta et al.

(10) Patent No.: US 11,968,635 B2
(45) Date of Patent: Apr. 23, 2024

(54) DIFFERENTIATION OF TERRESTRIAL AND NON-TERRESTRIAL CELLS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Liangping Ma, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/348,526

(22) Filed: Jun. 15, 2021

(65) Prior Publication Data

US 2022/0007313 A1 Jan. 6, 2022

Related U.S. Application Data

(60) Provisional application No. 63/047,238, filed on Jul. 1, 2020.

(51) Int. Cl.
*H04W 56/00* (2009.01)
*H04J 13/00* (2011.01)
(Continued)

(52) U.S. Cl.
CPC ....... *H04W 56/001* (2013.01); *H04J 13/0062* (2013.01); *H04W 72/0446* (2013.01);
(Continued)

(58) Field of Classification Search
CPC ............ H04W 56/001; H04W 72/005; H04W 72/0466; H04W 72/048; H04W 72/1263; H04W 84/06; H04J 13/0062
(Continued)

(56) References Cited

U.S. PATENT DOCUMENTS

2018/0241495 A1* 8/2018 Xue ........................ H04J 11/00
2020/0100291 A1* 3/2020 Ravishankar ......... H04W 76/10
(Continued)

FOREIGN PATENT DOCUMENTS

| GB | 2576203 A * | 2/2020 | ......... H04B 7/18504 |
|---|---|---|---|
| WO | WO-2020034333 A1 | 2/2020 | |
| WO | WO-2020163610 A1 * | 8/2020 | ......... H04B 7/18504 |

OTHER PUBLICATIONS

"Architectures and Key Technical Challenges for 5G Systems Incorporating Satellites", 1806.02088.pdf (Year: 2018).*
(Continued)

*Primary Examiner* — Intekhaab A Siddiquee
(74) *Attorney, Agent, or Firm* — Holland & Hart LLP

(57) ABSTRACT

Methods, systems, and devices for wireless communications are described. A base station may determine a terrestrial characteristic of a cell associated with the base station. A UE may perform a synchronization procedure with the cell and may receive, as part of the synchronization procedure, broadcast signaling associated with the cell. The broadcast signaling may identify the terrestrial characteristic of the cell. The base station may initiate communications with the UE based on the broadcast signaling including the indication of the terrestrial characteristic of the cell.

26 Claims, 17 Drawing Sheets

(51) Int. Cl.
  *H04W 72/044* (2023.01)
  *H04W 72/0446* (2023.01)
  *H04W 72/1263* (2023.01)
  *H04W 72/30* (2023.01)
  *H04W 72/51* (2023.01)
  *H04W 84/06* (2009.01)

(52) U.S. Cl.
  CPC ... *H04W 72/0466* (2013.01); *H04W 72/1263* (2013.01); *H04W 72/30* (2023.01); *H04W 72/51* (2023.01); *H04W 84/06* (2013.01)

(58) Field of Classification Search
  USPC ........................................................ 370/503
  See application file for complete search history.

(56) References Cited

U.S. PATENT DOCUMENTS

2020/0351957 A1* 11/2020 Kim .................. H04W 74/0866
2021/0119861 A1*  4/2021 Tripathi ............ H04W 56/0035
2021/0194571 A1*  6/2021 Ma .................... H04B 7/18558
2021/0235416 A1*  7/2021 Dou ...................... H04W 16/28

OTHER PUBLICATIONS 62923671P (Year: 2019).*
International Search Report and Written Opinion—PCT/US2021/037620—ISA/EPO—dated Oct. 21, 2021 (205813WO).

* cited by examiner

DIFFERENTIATION OF TERRESTRIAL AND NON-TERRESTRIAL CELLS

CROSS REFERENCE

The present application for patent claims the benefit of U.S. Provisional Patent Application No. 63/047,238 by Sengupta et al., entitled "DIFFERENTIATION OF TERRESTRIAL AND NON-TERRESTRIAL CELLS," filed Jul. 1, 2020, assigned to the assignee hereof, and expressly incorporated by reference herein.

FIELD OF TECHNOLOGY

The following relates generally to wireless communications and more specifically to differentiation of terrestrial and non-terrestrial cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may be narrowband (NB) internet of things (IoT) networks supporting non-terrestrial communications. NB-IoT non-terrestrial networks may be associated with characteristics different from those of terrestrial networks, and as such, conventional signaling techniques for terrestrial networks may not be suitable or efficient when implemented in a non-terrestrial network.

SUMMARY

The described techniques relate to improved methods, systems, devices, and apparatuses that support differentiation of terrestrial and non-terrestrial cells. Generally, the described techniques provide for a user equipment (UE) to identify whether broadcast signaling is associated with a terrestrial network or a non-terrestrial network. For instance, a base station may determine a terrestrial characteristic of a cell associated with the base station. A UE may perform a synchronization procedure with the cell and may receive, as part of the synchronization procedure, broadcast signaling associated with the cell. The broadcast signaling may identify the terrestrial characteristic of the cell. The base station may initiate communications with the UE based on the broadcast signaling including the indication of the terrestrial characteristic of the cell.

A method for wireless communication at a UE is described. The method may include performing a synchronization procedure with a cell and receiving, as part of the synchronization procedure, broadcast signaling associated with the cell, where the broadcast signaling identifies a terrestrial characteristic of the cell.

An apparatus for wireless communication at a UE is described. The apparatus may include a processor, memory coupled with the processor, and instructions stored in the memory. The instructions may be executable by the processor to cause the apparatus to perform a synchronization procedure with a cell and receive, as part of the synchronization procedure, broadcast signaling associated with the cell, where the broadcast signaling identifies a terrestrial characteristic of the cell.

Another apparatus for wireless communication at a UE is described. The apparatus may include means for performing a synchronization procedure with a cell and means for receiving, as part of the synchronization procedure, broadcast signaling associated with the cell, where the broadcast signaling identifies a terrestrial characteristic of the cell.

A non-transitory computer-readable medium storing code for wireless communication at a UE is described. The code may include instructions executable by a processor to perform a synchronization procedure with a cell and receive, as part of the synchronization procedure, broadcast signaling associated with the cell, where the broadcast signaling identifies a terrestrial characteristic of the cell.

In some examples of the method, apparatuses, and non-transitory computer-readable medium described herein, receiving the broadcast signaling may include operations, features, means, or instructions for receiving at least one synchronization signal that identifies the terrestrial characteristic of the cell.

Some examples of the method, apparatuses, and non-transitory computer-readable medium described herein may further include operations, features, means, or instructions for identifying a resource mapping configuration for the at least one synchronization signal, where the resource mapping configuration may be specific to the terrestrial characteristic of the cell.

In some examples of the method, apparatuses, and non-transitory computer-readable medium, the terrestrial characteristic of the cell corresponds to a number of symbols in a subframe or a slot associated with the resource mapping configuration for the at least one synchronization signal, and the method, apparatuses, and non-transitory computer-readable medium described herein may further include operations, features, means, or instructions for identifying that the cell may be associated with a non-terrestrial network based on the number of symbols in the subframe or the slot being above a threshold number.

In some examples of the method, apparatuses, and non-transitory computer-readable medium, the terrestrial characteristic of the cell corresponds to whether one or more resources of the resource mapping configuration map to a set of one or more starting symbols of a subframe or a slot associated with a control region for terrestrial communications, and the method, apparatuses, and non-transitory computer-readable medium described herein may further include operations, features, means, or instructions for identifying that the cell may be associated with a non-terrestrial network based on at least one of the one or more resources of the resource mapping configuration being mapped to the set of one or more starting symbols.

Some examples of the method, apparatuses, and non-transitory computer-readable medium described herein may further include operations, features, means, or instructions for identifying at least one of a base sequence, a Zadoff-Chu root, a scrambling sequence, a binary sequence, a covercode, a cyclic shift associated with the at least one synchronization signal and specific to the terrestrial characteristic of the cell.

Some examples of the method, apparatuses, and non-transitory computer-readable medium described herein may further include operations, features, means, or instructions for identifying one or more time locations of the at least one synchronization signal and specific to the terrestrial characteristic of the cell.

In some examples of the method, apparatuses, and non-transitory computer-readable medium described herein, each of the one or more time locations includes a location of a subframe or a slot within a radio frame and specific to the terrestrial characteristic of the cell.

In some examples of the method, apparatuses, and non-transitory computer-readable medium described herein, the location of the subframe or the slot for each of the one or more time locations includes an absolute location specific to the terrestrial characteristic of the cell or a relative location among the at least one synchronization signal and specific to the terrestrial characteristic of the cell.

In some examples of the method, apparatuses, and non-transitory computer-readable medium described herein, the one or more time locations of the at least one synchronization signal may be specific to a duplexing mode for the cell.

In some examples of the method, apparatuses, and non-transitory computer-readable medium described herein, the at least one synchronization signal includes a primary synchronization signal, a secondary synchronization signal, or both.

In some examples of the method, apparatuses, and non-transitory computer-readable medium described herein, the primary synchronization signal includes a narrowband primary synchronization signal, the secondary synchronization signal includes a narrowband secondary synchronization signal, or both.

In some examples of the method, apparatuses, and non-transitory computer-readable medium described herein, receiving the broadcast signaling may include operations, features, means, or instructions for receiving a physical broadcast channel transmission that identifies the terrestrial characteristic of the cell.

Some examples of the method, apparatuses, and non-transitory computer-readable medium described herein may further include operations, features, means, or instructions for identifying a resource mapping configuration for the physical broadcast channel transmission, where the resource mapping configuration may be specific to the terrestrial characteristic of the cell.

In some examples of the method, apparatuses, and non-transitory computer-readable medium, the terrestrial characteristic of the cell corresponds to a number of symbols in a subframe or a slot associated with the resource mapping configuration for the at least one synchronization signal, and the method, apparatuses, and non-transitory computer-readable medium described herein may further include operations, features, means, or instructions for identifying that the cell may be associated with a non-terrestrial network based on the number of symbols in the subframe or the slot being above a threshold number.

In some examples of the method, apparatuses, and non-transitory computer-readable medium, the terrestrial characteristic of the cell corresponds to whether one or more resources of the resource mapping configuration map to a set of one or more starting symbols of a subframe or a slot associated with a control region for terrestrial communications, and the method, apparatuses, and non-transitory computer-readable medium described herein may further include operations, features, means, or instructions for identifying that the cell may be associated with a non-terrestrial network based on at least one of the one or more resources of the resource mapping configuration being mapped to the set of one or more starting symbols.

In some examples of the method, apparatuses, and non-transitory computer-readable medium, the terrestrial characteristic of the cell corresponds to whether one or more resources of the resource mapping configuration map to one or more resource elements associated with communicating a cell-specific reference signal in terrestrial communications, and the method, apparatuses, and non-transitory computer-readable medium described herein may further include operations, features, means, or instructions for identifying that the cell may be associated with a non-terrestrial network based on at least one of the one or more resources of the resource mapping configuration being mapped to the one or more resource elements.

Some examples of the method, apparatuses, and non-transitory computer-readable medium described herein may further include operations, features, means, or instructions for identifying a scrambling sequence associated with the physical broadcast channel transmission and specific to the terrestrial characteristic of the cell.

Some examples of the method, apparatuses, and non-transitory computer-readable medium described herein may further include operations, features, means, or instructions for identifying one or more time locations of the physical broadcast channel transmission and specific to the terrestrial characteristic of the cell.

In some examples of the method, apparatuses, and non-transitory computer-readable medium described herein, each of the one or more time locations includes a location of a subframe or a slot within a radio frame specific to the terrestrial characteristic of the cell.

In some examples of the method, apparatuses, and non-transitory computer-readable medium described herein, the one or more time locations of the physical broadcast channel transmission may be specific to a duplexing mode for the cell.

In some examples of the method, apparatuses, and non-transitory computer-readable medium described herein, the physical broadcast channel transmission includes a narrowband physical broadcast channel transmission.

In some examples of the method, apparatuses, and non-transitory computer-readable medium described herein, receiving the broadcast signaling may include operations, features, means, or instructions for receiving a master information block transmission that identifies the terrestrial characteristic of the cell.

In some examples of the method, apparatuses, and non-transitory computer-readable medium described herein, the indication of the terrestrial characteristic of the cell corresponds to a bit field of the master information block transmission that indicates the terrestrial characteristic.

In some examples of the method, apparatuses, and non-transitory computer-readable medium described herein, the master information block transmission indicates one out of a set of one or more deployment modes, where the deployment modes of the set may be specific to the terrestrial characteristic.

Some examples of the method, apparatuses, and non-transitory computer-readable medium described herein may further include operations, features, means, or instructions for determining that the cell may be a target for camping by the UE based on the terrestrial characteristic of the cell, and camping on the cell based on the determining.

In some examples of the method, apparatuses, and non-transitory computer-readable medium described herein, the terrestrial characteristic indicates whether the cell may be associated with a terrestrial network or a non-terrestrial network.

In some examples of the method, apparatuses, and non-transitory computer-readable medium described herein, the cell includes a narrowband cell (NCell).

A method for wireless communication at a base station is described. The method may include determining a terrestrial characteristic of a cell associated with the base station, transmitting broadcast signaling associated with the cell, where the broadcast signaling identifies the terrestrial characteristic of the cell, and initiating communications with a UE based on the broadcast signaling identifying the terrestrial characteristic of the cell.

An apparatus for wireless communication at a base station is described. The apparatus may include a processor, memory coupled with the processor, and instructions stored in the memory. The instructions may be executable by the processor to cause the apparatus to determine a terrestrial characteristic of a cell associated with the base station, transmit broadcast signaling associated with the cell, where the broadcast signaling identifies the terrestrial characteristic of the cell, and initiate communications with a UE based on the broadcast signaling identifying the terrestrial characteristic of the cell.

Another apparatus for wireless communication at a base station is described. The apparatus may include means for determining a terrestrial characteristic of a cell associated with the base station, means for transmitting broadcast signaling associated with the cell, where the broadcast signaling identifies the terrestrial characteristic of the cell, and means for initiating communications with a UE based on the broadcast signaling identifying the terrestrial characteristic of the cell.

A non-transitory computer-readable medium storing code for wireless communication at a base station is described. The code may include instructions executable by a processor to determine a terrestrial characteristic of a cell associated with the base station, transmit broadcast signaling associated with the cell, where the broadcast signaling identifies the terrestrial characteristic of the cell, and initiate communications with a UE based on the broadcast signaling identifying the terrestrial characteristic of the cell.

In some examples of the method, apparatuses, and non-transitory computer-readable medium described herein, transmitting the broadcast signaling may include operations, features, means, or instructions for transmitting at least one synchronization signal that identifies the terrestrial characteristic of the cell.

Some examples of the method, apparatuses, and non-transitory computer-readable medium described herein may further include operations, features, means, or instructions for identifying a resource mapping configuration for the at least one synchronization signal, where the resource mapping configuration may be specific to the terrestrial characteristic of the cell, and where transmitting the at least one synchronization signal may be based on the determined resource mapping configuration.

In some examples of the method, apparatuses, and non-transitory computer-readable medium described herein, the terrestrial characteristic of the cell corresponds to a number of symbols in a subframe or a slot associated with the resource mapping configuration for the at least one synchronization signal.

In some examples of the method, apparatuses, and non-transitory computer-readable medium described herein, the terrestrial characteristic of the cell corresponds to whether one or more resources of the resource mapping configuration map to a set of one or more starting symbols of a subframe or a slot associated with a control region for terrestrial communications.

Some examples of the method, apparatuses, and non-transitory computer-readable medium described herein may further include operations, features, means, or instructions for identifying at least one of a base sequence, a Zadoff-Chu root, a scrambling sequence, a binary sequence, a cover-code, a cyclic shift associated with the at least one synchronization signal and specific to the terrestrial characteristic of the cell, where transmitting the at least one synchronization signal may be based on the determined at least one of the base sequence, the Zadoff-Chu root, the scrambling sequence, the binary sequence, the cover-code, or the cyclic shift.

Some examples of the method, apparatuses, and non-transitory computer-readable medium described herein may further include operations, features, means, or instructions for identifying one or more time locations of the at least one synchronization signal and specific to the terrestrial characteristic of the cell, where transmitting the at least one synchronization signal may be based on the determined one or more time locations.

In some examples of the method, apparatuses, and non-transitory computer-readable medium described herein, each of the one or more time locations includes a location of a subframe or a slot within a radio frame specific to the terrestrial characteristic of the cell.

In some examples of the method, apparatuses, and non-transitory computer-readable medium described herein, the location of the subframe or the slot for each of the one or more time locations includes an absolute location specific to the terrestrial characteristic of the cell or a relative location among the at least one synchronization signal and specific to the terrestrial characteristic of the cell.

In some examples of the method, apparatuses, and non-transitory computer-readable medium described herein, the one or more time locations of the at least one synchronization signal may be specific to a duplexing mode for the cell.

In some examples of the method, apparatuses, and non-transitory computer-readable medium described herein, the at least one synchronization signal includes a primary synchronization signal, a secondary synchronization signal, or both.

In some examples of the method, apparatuses, and non-transitory computer-readable medium described herein, the primary synchronization signal includes a narrowband primary synchronization signal, the secondary synchronization signal includes a narrowband secondary synchronization signal, or both.

In some examples of the method, apparatuses, and non-transitory computer-readable medium described herein, transmitting the broadcast signaling may include operations, features, means, or instructions for transmitting a physical broadcast channel transmission that identifies the terrestrial characteristic of the cell.

Some examples of the method, apparatuses, and non-transitory computer-readable medium described herein may further include operations, features, means, or instructions for identifying a resource mapping configuration for the physical broadcast channel transmission, where the resource mapping configuration may be specific to the terrestrial characteristic of the cell, and where transmitting the physical broadcast channel transmission may be based on the determined resource mapping configuration.

In some examples of the method, apparatuses, and non-transitory computer-readable medium described herein, the terrestrial characteristic of the cell corresponds to a number of symbols in a subframe or a slot associated with the resource mapping configuration for the physical broadcast channel transmission.

In some examples of the method, apparatuses, and non-transitory computer-readable medium described herein, the terrestrial characteristic of the cell corresponds to whether one or more resources of the resource mapping configuration map to a set of one or more starting symbols of a subframe or a slot associated with a control region for terrestrial communications.

In some examples of the method, apparatuses, and non-transitory computer-readable medium described herein, the terrestrial characteristic of the cell corresponds to whether one or more resources of the resource mapping configuration map to one or more resource elements associated with communicating a cell-specific reference signal in terrestrial communications.

Some examples of the method, apparatuses, and non-transitory computer-readable medium described herein may further include operations, features, means, or instructions for identifying a scrambling sequence associated with the physical broadcast channel transmission and specific to the terrestrial characteristic of the cell, where transmitting the physical broadcast channel transmission may be based on the determined scrambling sequence.

Some examples of the method, apparatuses, and non-transitory computer-readable medium described herein may further include operations, features, means, or instructions for identifying one or more time locations of the physical broadcast channel transmission and specific to the terrestrial characteristic of the cell.

In some examples of the method, apparatuses, and non-transitory computer-readable medium described herein, each of the one or more time locations includes a location of a subframe or a slot within a radio frame specific to the terrestrial characteristic of the cell.

In some examples of the method, apparatuses, and non-transitory computer-readable medium described herein, the one or more time locations of the physical broadcast channel transmission may be specific to a duplexing mode for the cell.

In some examples of the method, apparatuses, and non-transitory computer-readable medium described herein, the physical broadcast channel transmission includes a narrowband physical broadcast channel transmission.

In some examples of the method, apparatuses, and non-transitory computer-readable medium described herein, transmitting the broadcast signaling may include operations, features, means, or instructions for transmitting a master information block transmission that identifies the terrestrial characteristic of the cell.

In some examples of the method, apparatuses, and non-transitory computer-readable medium described herein, the indication of the terrestrial characteristic of the cell corresponds to a bit field of the master information block transmission that indicates the terrestrial characteristic.

In some examples of the method, apparatuses, and non-transitory computer-readable medium described herein, the master information block transmission indicates one out of a set of one or more deployment modes, where the deployment modes of the set may be specific to the terrestrial characteristic.

In some examples of the method, apparatuses, and non-transitory computer-readable medium described herein, the terrestrial characteristic indicates whether the cell may be associated with a terrestrial network or a non-terrestrial network.

In some examples of the method, apparatuses, and non-transitory computer-readable medium described herein, the cell includes a narrowband cell (NCell).

A method for wireless communication at a user equipment (UE) is described. The method may include performing a synchronization procedure with a cell and receiving broadcast signaling associated with the cell, where the broadcast signaling identifies a terrestrial characteristic of the cell, where the terrestrial characteristic indicates whether the cell is associated with a terrestrial network or a non-terrestrial network.

An apparatus for wireless communication at a UE is described. The apparatus may include a processor, memory coupled with the processor, and instructions stored in the memory. The instructions may be executable by the processor to cause the apparatus to perform a synchronization procedure with a cell and receive broadcast signaling associated with the cell, where the broadcast signaling identifies a terrestrial characteristic of the cell, where the terrestrial characteristic indicates whether the cell is associated with a terrestrial network or a non-terrestrial network.

Another apparatus for wireless communication at a UE is described. The apparatus may include means for performing a synchronization procedure with a cell and means for receiving broadcast signaling associated with the cell, where the broadcast signaling identifies a terrestrial characteristic of the cell, where the terrestrial characteristic indicates whether the cell is associated with a terrestrial network or a non-terrestrial network.

A non-transitory computer-readable medium storing code for wireless communication at a UE is described. The code may include instructions executable by a processor to perform a synchronization procedure with a cell and receive broadcast signaling associated with the cell, where the broadcast signaling identifies a terrestrial characteristic of the cell, where the terrestrial characteristic indicates whether the cell is associated with a terrestrial network or a non-terrestrial network.

In some examples of the method, apparatuses, and non-transitory computer-readable medium described herein, receiving the broadcast signaling may include operations, features, means, or instructions for receiving an information block transmission that identifies the terrestrial characteristic of the cell.

In some examples of the method, apparatuses, and non-transitory computer-readable medium described herein, the indication of the terrestrial characteristic of the cell corresponds to a bit field of the information block transmission that indicates the terrestrial characteristic.

In some examples of the method, apparatuses, and non-transitory computer-readable medium described herein, the information block transmission indicates one out of a set of one or more deployment modes, and the deployment modes of the set may be specific to the terrestrial characteristic.

Some examples of the method, apparatuses, and non-transitory computer-readable medium described herein may further include operations, features, means, or instructions for identifying a resource mapping configuration for the broadcast signaling, where the resource mapping configuration may be specific to the terrestrial characteristic of the cell.

In some examples of the method, apparatuses, and non-transitory computer-readable medium described herein, the terrestrial characteristic of the cell corresponds to a number of symbols in a subframe or a slot associated with the resource mapping configuration for the broadcast signaling and the method, apparatuses, and non-transitory computer-readable medium may include further operations, features, means, or instructions for identifying that the cell may be associated with a non-terrestrial network based on the number of symbols in the subframe or the slot being above a threshold number.

In some examples of the method, apparatuses, and non-transitory computer-readable medium described herein, the terrestrial characteristic of the cell corresponds to whether one or more resources of the resource mapping configuration map to a set of one or more starting symbols of a subframe or a slot associated with a control region for terrestrial communications and the method, apparatuses, and non-transitory computer-readable medium may include further operations, features, means, or instructions for identifying that the cell may be associated with a non-terrestrial network based on at least one of the one or more resources of the resource mapping configuration being mapped to the set of one or more starting symbols.

In some examples of the method, apparatuses, and non-transitory computer-readable medium described herein, the terrestrial characteristic of the cell corresponds to whether one or more resources of the resource mapping configuration map to one or more resource elements associated with communicating a cell-specific reference signal in terrestrial communications and the method, apparatuses, and non-transitory computer-readable medium may include further operations, features, means, or instructions for identifying that the cell may be associated with a non-terrestrial network based on at least one of the one or more resources of the resource mapping configuration being mapped to the one or more resource elements.

Some examples of the method, apparatuses, and non-transitory computer-readable medium described herein may further include operations, features, means, or instructions for identifying at least one of a base sequence, a Zadoff-Chu root, a scrambling sequence, a binary sequence, a cover-code, a cyclic shift associated with the broadcast signaling and specific to the terrestrial characteristic of the cell.

Some examples of the method, apparatuses, and non-transitory computer-readable medium described herein may further include operations, features, means, or instructions for identifying one or more time locations of the broadcast signaling and specific to the terrestrial characteristic of the cell.

In some examples of the method, apparatuses, and non-transitory computer-readable medium described herein, each of the one or more time locations includes a location of a subframe or a slot within a radio frame and specific to the terrestrial characteristic of the cell, and the location of the subframe or the slot for each of the one or more time locations includes an absolute location specific to the terrestrial characteristic of the cell or a relative location among the broadcast signaling and specific to the terrestrial characteristic of the cell.

In some examples of the method, apparatuses, and non-transitory computer-readable medium described herein, the one or more time locations of the broadcast signaling may be specific to a duplexing mode for the cell.

Some examples of the method, apparatuses, and non-transitory computer-readable medium described herein may further include operations, features, means, or instructions for determining that the cell may be a target for camping by the UE based on the terrestrial characteristic of the cell and camping on the cell based on the determining.

In some examples of the method, apparatuses, and non-transitory computer-readable medium described herein, the cell includes a narrowband cell (NCell).

DETAILED DESCRIPTION

Figure 1:
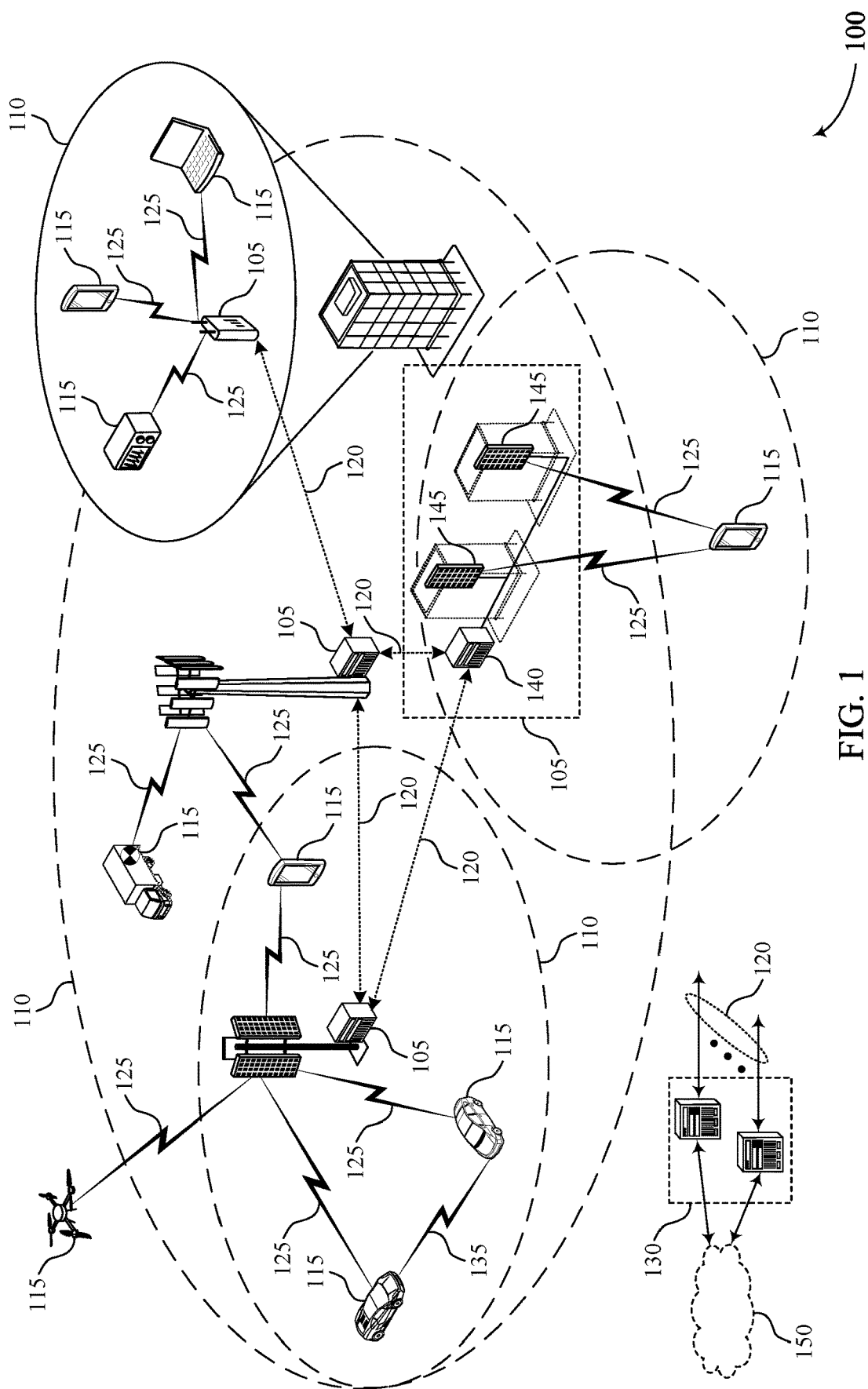
FIG. 1 illustrates an example of a wireless communications system that supports differentiation of terrestrial and non-terrestrial cells in accordance with aspects of the present disclosure.

In some examples, a user equipment (UE) may perform a synchronization procedure with a cell of a base station. Performing the synchronization procedure may involve the UE receiving a broadcast transmission (e.g., one or more synchronization signals such as a primary synchronization signal (PSS), a secondary synchronization signal (SSS), an associated physical broadcast channel (PBCH) transmission, an information block transmission (e.g., a master information block (MIB)), or any combination thereof). Synchronization signals, PBCH transmissions, and information block transmissions may generally be referred to as broadcast signaling. After performing a successful synchronization procedure with the cell of the base station, the UE may camp on the cell of the base station.

A base station may communicate with a UE in a terrestrial network or a non-terrestrial (NTN) network (e.g., a network that includes satellites between a ground station and a UE). The cell via which the UE and the base station may communicate may be referred to as a terrestrial cell if the base station is associated with a terrestrial network and may be referred to as an NTN cell if the base station is associated with an NTN. In some cases, it may be desirable for an NTN-incapable UE (e.g., a UE that may be configured to communicate with a terrestrial cell but may not be configured to communicate with an NTN cell) to communicate with a terrestrial cell and for an NTN-capable UE (e.g., a UE configured to communicate with an NTN cell and, in some examples, a terrestrial cell) to communicate with an NTN cell. However, there may be instances where an NTN band is close to (e.g., within a threshold range of) a terrestrial band in frequency. In such cases, an NTN-incapable UE or NTN-capable UE may receive broadcast signaling from an NTN cell or a terrestrial cell, respectively, and may attempt to camp on an associated NTN cell or terrestrial cell, respectively.

The techniques described herein may prevent an NTN-incapable UE from camping on an NTN cell and/or may facilitate an NTN-capable UE in distinguishing between a terrestrial cell and an NTN cell. For instance, a terrestrial cell and an NTN cell may communicate broadcast signaling with different associated formats, configurations, or parameters such that whether a cell is a terrestrial cell or an NTN cell may be distinguishable from the broadcast signaling. For instance, terrestrial network broadcast signaling and NTN broadcast signaling may have different resource element mappings, different associated sequences (e.g., base sequences, Zadoff-Chu roots, binary sequences, covercodes, or cyclic shifts), different applied scramblings, different time locations, or any combination thereof.

Aspects of the disclosure are initially described in the context of wireless communications systems. Additional aspects of the disclosure are described in the context of resource mapping configurations and a process flow. Aspects of the disclosure are further illustrated by and described with reference to apparatus diagrams, system diagrams, and flowcharts that relate to differentiation of terrestrial and non-terrestrial cells.

FIG. 1 illustrates an example of a wireless communications system 100 that supports differentiation of terrestrial and non-terrestrial cells in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of one or more the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Terrestrial wireless devices (e.g., UEs 115 and/or base stations 105) performing Narrowband Internet of Things (NB-IoT) communications may support one or more deployment modes. For instance, a terrestrial device may support an in-band deployment mode in which multiple radio access technologies (RATs), such as NR and LTE, share a same physical cell identifier (PCI). Additionally, a terrestrial device may support an in-band deployment mode in which some or each RAT have different associated PCIs. In both in-band deployment modes, the terrestrial device may communicate within a band of a carrier associated with a RAT such as NR or LTE. Additionally, a terrestrial device may support a guard band deployment mode, in which the terrestrial device communicates in a guard band (e.g., a guard band of carrier). Additionally, a terrestrial device may support a standalone deployment mode.

In some examples, the deployment modes supported for NTN NB-IoT and terrestrial NB-IoT may be different. For instance, an NTN device may support a standalone deployment mode, a guard-band deployment mode, and an in-band NR deployment mode. An NTN device communicating in the standalone deployment mode may use no raster offset and may have no reserved resource elements (REs). An NTN device communicating in a guard-band deployment mode may have a raster offset with a predefined value (e.g., +/−2.5 kHz or +/−7.5 kHz), but may have no reserved REs. An NTN device communicating in an in-band NR deployment mode may have a raster offset with a predefined value (e.g., +/−2.5 kHz or +/−7.5 kHz) and may not have reserved REs for a cell-specific reference signal (CRS). In some examples, the NTN device may have reserved REs for a control region. An NB-IoT device communicating over an NTN may not support a deployment mode that is in-band with LTE. Due to the in-band NR deployment mode not having REs for CRS and, in some examples, not having REs for a control region, the in-band NR deployment mode for an NTN device may differ from the in-band deployment modes for a terrestrial device (e.g., an in-band LTE deployment mode), which may support reserved REs for an LTE control region and CRS for LTE communications.

Due to in-band NR deployment for NTN devices being different from in-band LTE deployments for terrestrial devices, master information blocks (MIBs) for terrestrial devices performing NB-IoT communications (i.e., an NB-MIB) may have different information or content than MIBs for NTN devices (i.e., NB-MIB-NTN). The NB-MIB may indicate a first deployment mode (e.g., in-band LTE, guard-band, standalone) and the NB-MIB-NTN may indicate a second deployment mode (e.g., in-band NR, guard band, standalone). Additionally, to differentiate between a terrestrial cell and a non-terrestrial cell, an NB-MIB-NTN may include an indication (e.g., a one bit indication) indicating whether a cell is terrestrial or NTN.

In some examples, an NTN-incapable UE 115 may receive broadcast signaling from an NTN cell. In such examples, if an NTN-incapable UE 115 detects the broadcast signaling, the NTN-incapable UE 115 may waste power in the process of attempting to camp on the NTN cell (e.g., while synchronizing with the cell or by reading a system information block (SIB) received from the cell). The methods as described herein may aid in preventing NTN-incapable UEs 115 from camping on NTN cells by making one or more signals received at the NTN-incapable UE 115 indiscernible to the NTN-incapable UE 115.

Generally, the described techniques provide for a UE 115 to identify whether broadcast signaling is associated with a terrestrial network or a non-terrestrial network. For instance, a base station 105 may determine a terrestrial characteristic of a cell associated with the base station 105. A UE 115 may perform a synchronization procedure with the cell and may receive, as part of the synchronization procedure, broadcast signaling associated with the cell. The broadcast signaling may identify the terrestrial characteristic of the cell. The base station 105 may initiate communications with the UE 115 based on the broadcast signaling including the indication of the terrestrial characteristic of the cell.

Figure 2:
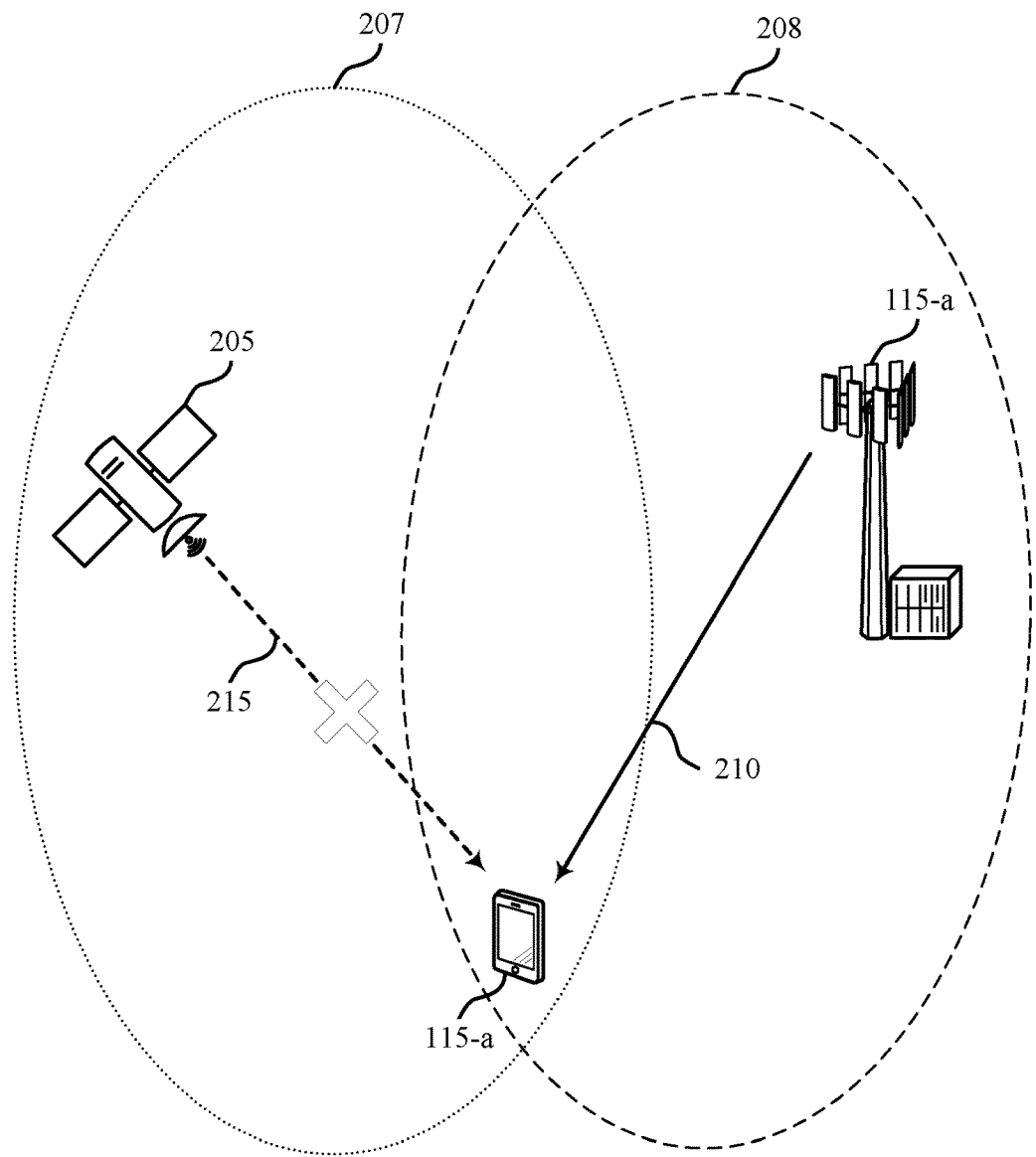
FIG. 2 illustrates an example of a wireless communications system that supports differentiation of terrestrial and non-terrestrial cells in accordance with aspects of the present disclosure.

FIG. 2 illustrates an example of a wireless communications system 200 that supports differentiation of terrestrial and non-terrestrial cells in accordance with aspects of the present disclosure. In some examples, wireless communications system 200 may implement aspects of wireless communications system 100. For instance, UE 115-*a* may be an example of a UE 115 as described with reference to FIG. 1 and base station 105-*a* may be an example of a base station 105 as described with reference to FIG. 1.

NTN device 205 (e.g., a satellite) may be associated with an NTN cell 207 and base station 105-*a* may be associated with a terrestrial cell 208. In some examples, UE 115-*a* may be an example of a NTN-incapable UE 115 and may perform a synchronization procedure with terrestrial cell 208. Performing the synchronization procedure may involve UE 115-*a* receiving terrestrial broadcast signaling 210, which may include one or more synchronization signals (e.g., PSS and SSS) and/or a PBCH. Additionally, UE 115-*a* may receive an information block transmission (e.g., a MIB). In cases where UE 115-*a* is a NTN-incapable UE 115, UE 115-*a* may not perform the synchronization procedure with NTN cell 207 (e.g., a satellite). In such cases, UE 115-*a* may not receive or may not detect NTN broadcast signaling 215 according to the methods described herein.

In other examples, UE 115-*a* may be an example of an NTN-capable UE 115 and may perform a synchronization procedure with NTN cell 207. Performing the synchronization procedure may involve UE 115-*a* receiving NTN broadcast signaling 215, which may include one or more synchronization signals (e.g., PSS and SSS) and/or a PBCH transmission. Additionally, UE 115-*a* may receive an information block transmission (e.g., a MIB). In cases where UE 115-*a* is an NTN-capable UE 115, UE 115-*a* may not perform the synchronization procedure with terrestrial cell 208. In such cases, UE 115-*a* may not receive or may not detect terrestrial broadcast signaling 210 according to the methods as described herein.

To enable UE 115-*a* to differentiate between terrestrial broadcast signaling 210 and NTN broadcast signaling 215, terrestrial broadcast signaling 210 (e.g., a terrestrial narrowband primary synchronization signal (NPSS), a terrestrial narrowband secondary synchronization signal (NSSS), or a terrestrial narrowband physical broadcast channel (NPBCH)) may have a different design, different parameters, or a different mapping than NTN broadcast signaling 215 (e.g., an NTN-NPSS, an NTN-NSSS, or an NTN-NPBCH, respectively). For instance, different RE mappings may be used for NTN broadcast signaling 215 as compared to terrestrial broadcast signaling 210. In one example, terrestrial cell 208 may map terrestrial broadcast signaling 210 (e.g., NPSS, NSSS, and NPBCH) to 11 symbols in a subframe or slot and NTN cell 207 may map NTN broadcast signaling 215 (e.g., NTN-NPSS, NTN-NSSS, and NTN-NPBCH) to greater than 11 symbols in a subframe or slot (e.g., 14 symbols). Additionally or alternatively, terrestrial cell 208 may not map terrestrial broadcast signaling 210 to a set of one or more starting symbols (e.g., up to 3 symbols at a beginning of a subframe) in a subframe or slot and NTN cell 207 may map the NTN broadcast signaling 215 to the set of one or more starting symbols in the subframe or slot. In some examples, the set of one or more starting symbols may correspond to a control region of a subframe (e.g., a region for communicating physical downlink control channel (PDCCH) transmissions). Additionally or alternatively, terrestrial cell 208 may not map terrestrial broadcast signaling 210 to LTE CRS REs and NTN cell 207 may map NTN broadcast signaling 215 to REs reserved for LTE CRS in terrestrial cell 208. In some examples, higher priority NR signals (e.g., control signals) may puncture NTN-NPSS and/or NTN-NSSS for in-band NR deployments. Having more symbols for NTN broadcast signaling 215 may improve NPBCH coverage. Additional details about RE mapping may be described herein, for example, with reference to FIGS. 3A and 3B.

In some examples, terrestrial broadcast signaling 210 and NTN broadcast signaling 215 may be associated with different sequences. For instance NTN-NPSS and/or NTN-NSSS included in NTN broadcast signaling 215 may be associated with different base sequence(s) (e.g., Gold sequences, m-sequences), different Zadoff-Chu root(s), binary sequences and/or cover-codes (e.g., $b_q(.)$ in NSSS or NTN-NSSS, $S(.)$ in NPSS or NTN-NPSS), cyclic shifts (e.g., $\theta_f$ in NTN-NSSS or NSSS) than NPSS and/or NSSS, respectively, in terrestrial broadcast signaling 210. Additionally or alternatively, terrestrial broadcast signaling 210 and NTN broadcast signaling 215 may be associated with different applied scrambling (e.g., may have a different initialization $c_{init}$ of a Gold sequence generator). For instance, scrambling may generally involve performing a bitwise exclusive-or (XOR) of a binary sequence with a randomly generated sequence and may differ between terrestrial broadcast signaling 210 and NTN broadcast signaling 215 (e.g., between NTN-NPSS, NTN-NSSS, or NTN-NPBCH and NPSS, NSSS, or NPBCH, respectively.

In some examples, terrestrial broadcast signaling 210 and NTN broadcast signaling 215 may be mapped to different time locations (e.g., certain subframe location(s) in certain radio frame(s)). UE 115-*a* may identify absolute values for the time locations or, in cases where the broadcast signaling includes one or more synchronization signals, may identify time locations with values relative to the one or more synchronization signals. In some examples, the time-mapping may further be different for Narrowband cells (NCells) with different duplexing modes (e.g., FDD, TDD).

In some examples, the methods described herein may be associated with one or more advantages. For instance, by differentiating terrestrial broadcast signaling 210 from NTN broadcast signaling 215, UE 115-*a* may differentiate between a terrestrial network and an NTN network. By enabling the UE to differentiate between the terrestrial network and the non-terrestrial network, UE 115-*a* may refrain from camping on a cell of a network which UE 115-*a* is not configured to communicate with. Instead, UE 115-*a* may camp on a cell of a network UE 115-*a* is configured to communicate with.

Figure 3A:
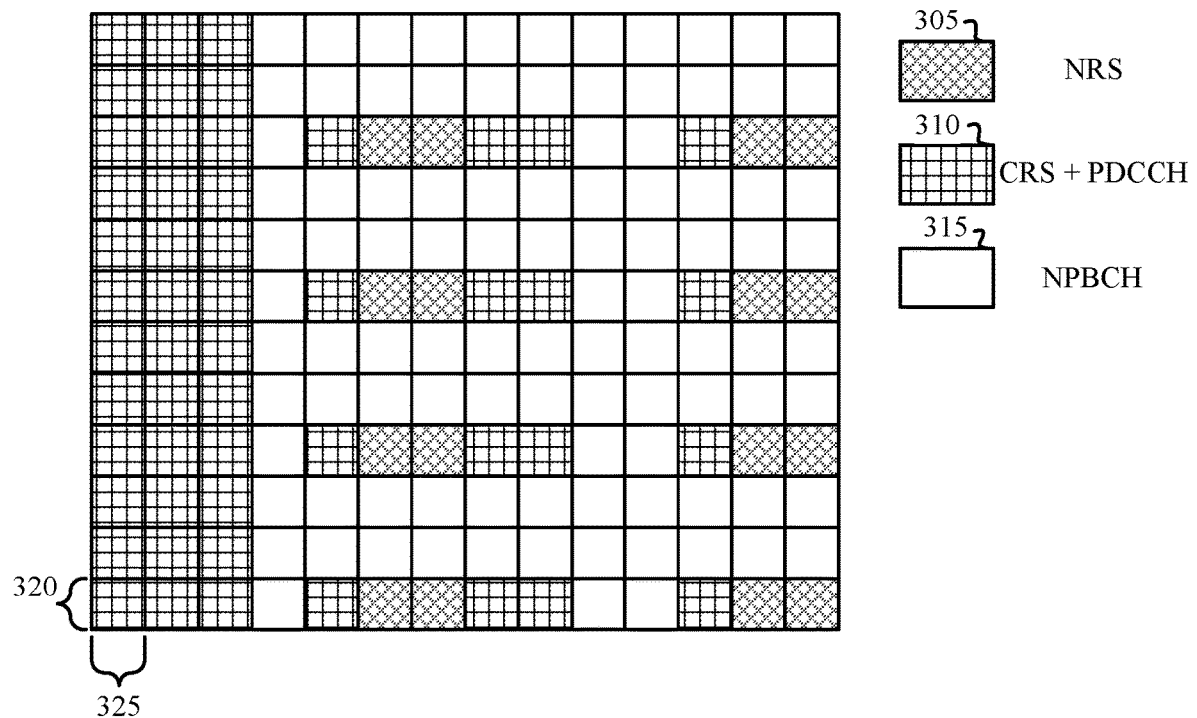
FIGS. 3A and 3B illustrate examples of resource mapping configurations that supports differentiation of terrestrial and non-terrestrial cells in accordance with aspects of the present disclosure.
Figure 3B:
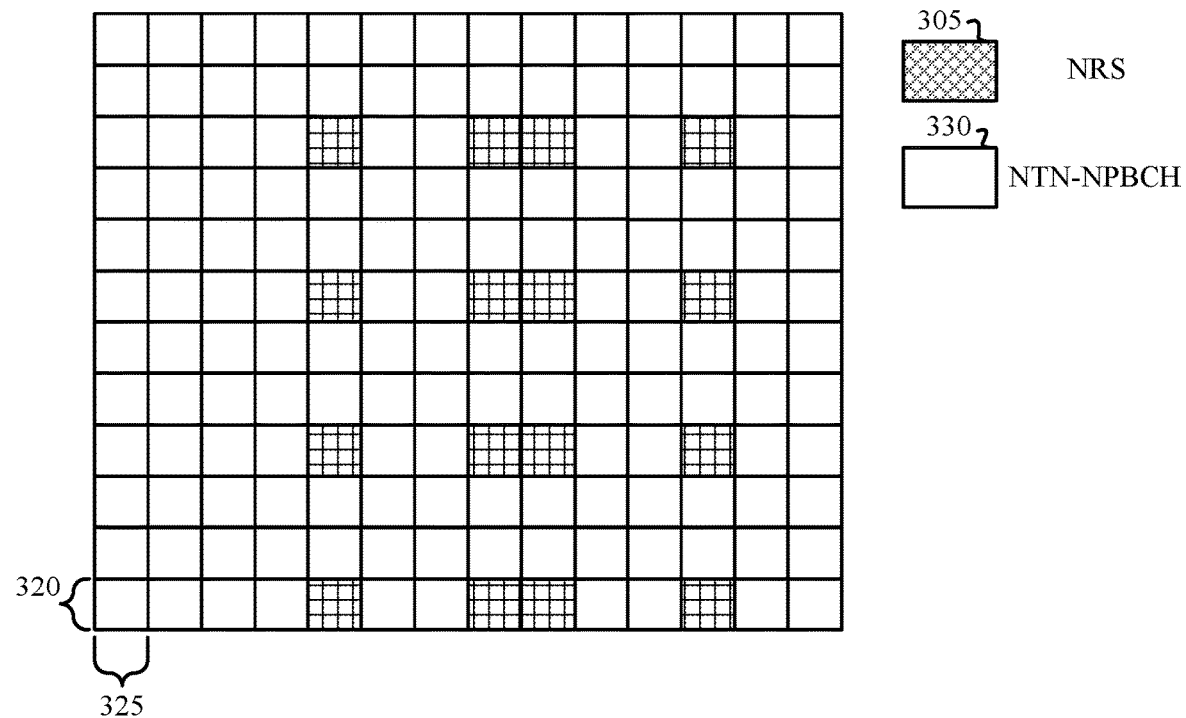

FIGS. 3A and 3B illustrate examples of resource mapping configurations 300-*a* and 300-*b* that support differentiation of terrestrial and non-terrestrial cells in accordance with aspects of the present disclosure. In some examples, resource mapping configurations 300-*a* and 300-*b* may be implemented by aspects of wireless communications system 100. For instance, resource mapping configuration 300-*a* may represent a resource mapping configuration for NB-IoT communications within a terrestrial cell and resource mapping configuration 300-*b* may represent a resource mapping configuration for NB-IoT communications within a non-terrestrial cell.

FIGS. 3A and 3B may illustrate respective resource grids defined by a number of sub-carriers 320 and a number of symbols 325. For instance, in the present example, the resource grid may include 12 sub-carriers 320 and 14 symbols 325. The intersection of a sub-carrier 320 and a symbol 325 may form an RE.

In FIG. 3A, A first set of the REs 305 may be allocated for communication of a narrowband reference signal (NRS); a second set of REs 310 may be allocated for communication of a CRS and a PDCCH transmission; and a third set of REs 315 allocated for communication of an NPBCH. The REs 310 within the leftmost three symbols 325 of the resource grid may represent a control region of the resource grid and may be the REs 310 that are allocated for communication of the PDCCH transmission. The remaining REs 310 of the second set may be allocated for reception of the CRS.

In FIG. 3B, a first set of REs 305 may be allocated for communication of an NRS and a second set of REs 330 may be allocated for communication of an NTN-NPBCH (e.g., an NPBCH for NTN communications). The second set of REs 330 of FIG. 3B may include the second set of REs 310 and the third set of REs 315 of FIG. 3A. In some examples, the second set of REs 330 of FIG. 3B may include some of the second set of REs 310 of FIG. 3A but not others (e.g., those associated with the control region of the second set of REs 310 or the CRS).

As discussed herein, a deployment scenario may be different for NTN NB-IoT communications as opposed to terrestrial NB-IoT communications. For instance, NTN devices performing NTN NB-IoT communications may not reserve resources (e.g., REs) for CRS and/or a control region of a subframe. For NPBCH, an RE mapping may involve the following: $y_f^{(p)}(0), \ldots, y_f^{(p)}(K-1)$ may be mapped in sequence starting with $y_f^{(p)}(0)$ to resource elements (k, l). The mapping to resource elements (k, l) not reserved for transmission of reference signals may be in increasing order of first the index k, then the index l. The first three OFDM symbols in a subframe may not be used in the mapping process. For the purpose of mapping, a UE 115 may not assume CRSs for antenna ports 903 and NB reference signals for antenna ports 2000 and 2001 being present irrespective of the actual configuration. The frequency shift of the CRSs may be calculated by replacing $N_{ID}^{cell}$ with $N_{ID}^{NCell}$ in the calculation of $v_{shift}$. However, refraining from mapping NTN-NPBCH to REs for the 3 OFDM symbols and the CRS REs may be wasteful in a case in which in-band LTE deployment is not supported for NTN NB-IoT, as one or more of these symbols or REs may not be used for other signaling such as CRS or LTE PDCCH.

Accordingly, the resource mapping for NTN-NPBCH may be different from that of NPBCH. For instance, the REs reserved for CRS and/or the first 3 OFDM symbols may be used for NTN-NPBCH mapping. By using some or each of the second set of REs 310 of FIG. 3A for communicating an NTN-NPBCH transmission, an NTN cell may allocate more resources for communicating the NTN-NPBCH transmission and may increase a likelihood that the NTN-NPBCH transmission is received.

Figure 4:
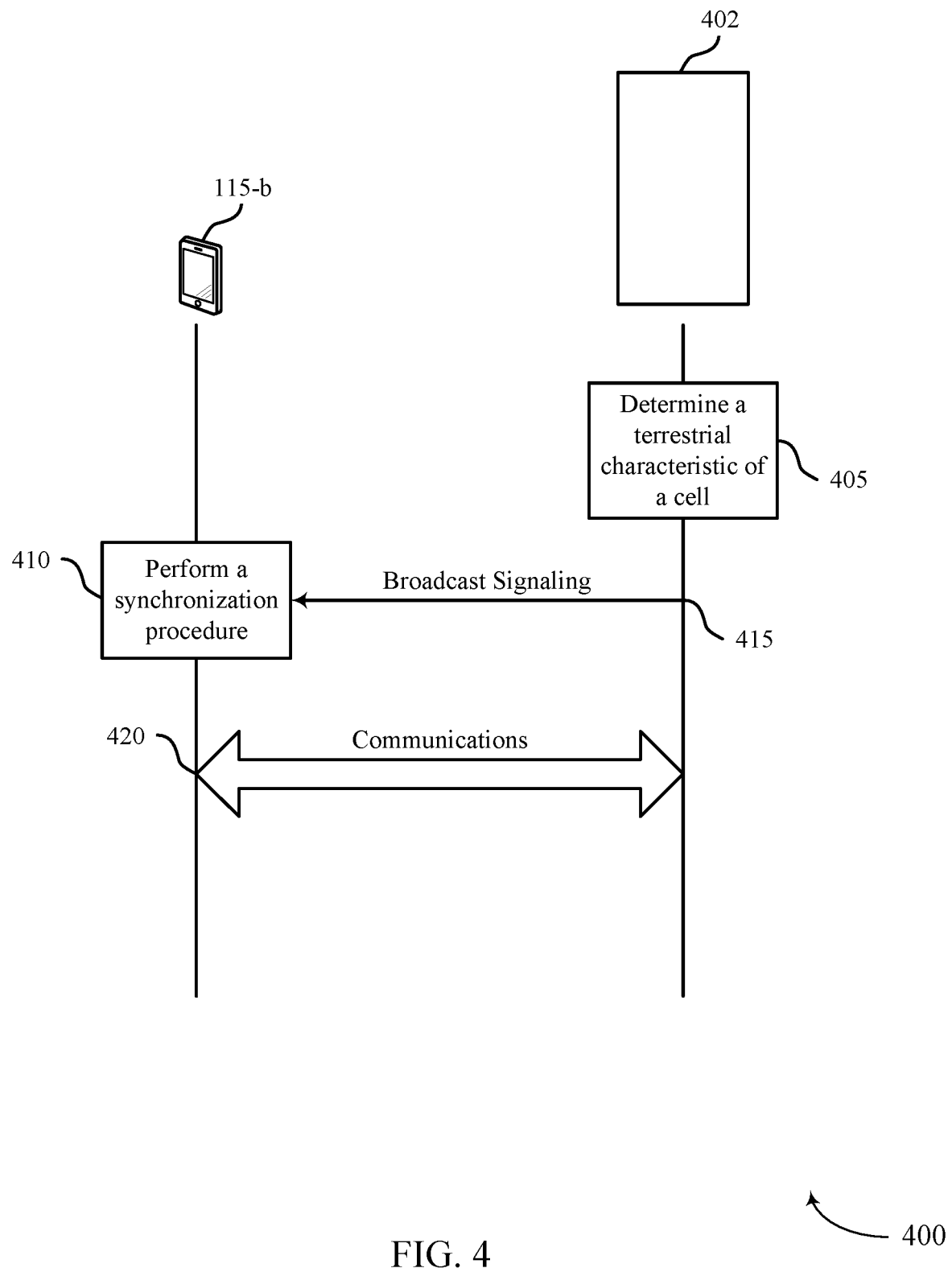
FIG. 4 illustrates an example of a process flow that supports differentiation of terrestrial and non-terrestrial cells in accordance with aspects of the present disclosure.

FIG. 4 illustrates an example of a process flow 400 that supports differentiation of terrestrial and non-terrestrial cells in accordance with aspects of the present disclosure. In some examples, process flow 400 may be implemented by aspects of wireless communications system 100. For instance, UE 115-b may be an example of a UE 115 as described with reference to FIG. 1 and device 402 may be an example of a base station 105 as described with reference to FIG. 1 or an NTN device 205 as described with reference to FIG. 2.

At 405, device 402 may determine a terrestrial characteristic of a cell associated with the device 402. In some cases, the cell includes or may be an NCell. In some examples, the terrestrial characteristic may indicate whether cell is associated with a terrestrial network or an NTN.

At 410, UE 115-b may perform a synchronization procedure with a cell of device 402.

At 415, device 402 may transmit broadcast signaling associated with the cell, where the broadcast signaling identifies a terrestrial characteristic of the cell. UE 115-b may receive the broadcast signaling associated. In some examples, UE 115-b may receive the broadcast signaling as part of a synchronization procedure (e.g., the synchronization procedure performed at 410).

In some examples, the broadcast signaling may include at least one synchronization signal that identifies the terrestrial characteristic of the cell. In some examples, the at least one synchronization signal may include a PSS, an SSS, or both. In some examples, the PSS may include or be an NPSS, the secondary synchronization signal may include or be an NSSS, or both.

In some examples, UE 115-b may identify a resource mapping configuration for the at least one synchronization signal, where the resource mapping configuration is specific to the terrestrial characteristic of the cell. In some examples, the terrestrial characteristic of the cell may correspond to a number of symbols in a subframe or a slot associated with the resource mapping configuration for the at least one synchronization signal. In some such examples, UE 115-b may identify that the cell is associated with an NTN based on the number of symbols in the subframe or the slot being above a threshold number. In some examples, the terrestrial characteristic of the cell corresponds to whether one or more resources of the resource mapping configuration map to a set of one or more starting symbols of a subframe or a slot associated with a control region for terrestrial communications. In some such examples, UE 115-b may identify that the cell is associated with an NTN based on at least one of the one or more resources of the resource mapping being mapped to the set of one or more starting symbols. In some examples, UE 115-b may identify at least one of a base sequence, a Zadoff-Chu root, a scrambling sequence, a binary sequence, a cover-code, a cyclic shift associated with the at least one synchronization signal and specific to the terrestrial characteristic of the cell.

In some examples, UE 115-b may identify one or more time locations of the at least one synchronization signal and specific to the terrestrial characteristic of the cell. In some cases, each of the one or more time locations includes a location of a subframe or a slot within a radio frame and specific to the terrestrial characteristic of the cell. In some cases, the location of the subframe or the slot for each of the one or more time locations includes an absolute location specific to the terrestrial characteristic of the cell or a relative location among the at least one synchronization signal and specific to the terrestrial characteristic of the cell. In some examples, the one or more time locations of the at least one synchronization signal are specific to a duplexing mode for the cell.

In some examples, the broadcast signaling may include a PBCH transmission that identifies the terrestrial characteristic of the cell. The PBCH transmission may include or be an NPBCH. In some examples, UE 115-b may identify a scrambling sequence associated with the physical broadcast channel transmission and specific to the terrestrial characteristic of the cell.

In some examples, UE 115-b may identify a resource mapping configuration for the physical broadcast channel transmission, where the resource mapping configuration is specific to the terrestrial characteristic of the cell. In some examples, the terrestrial characteristic of the cell may correspond to a number of symbols in a subframe or slot associated with the resource mapping configuration for the physical broadcast channel transmission. In some such examples, UE 115-*b* may identify that the cell is associated with an NTN based on the number of symbols in the subframe or the slot being above a threshold number. In some examples, the terrestrial characteristic of the cell may correspond to whether one or more resources of the resource mapping configuration map to a set of one or more starting symbols of a subframe or a slot associated with a control region for terrestrial communications. In some such examples, UE 115-*b* may identify that the cell is associated with an NTN based on the one or more resources of the resource mapping configured being mapped to the set of one or more starting symbols. In some examples, the terrestrial characteristic of the cell may correspond to whether one or more resources of the resource mapping configuration map to one or more resource elements associated with communicating a cell-specific reference signal in terrestrial communications. In some such examples, UE 115-*b* may identify that the cell is associated with an NTN based on the one or more resources of the resource mapping configuration being mapped to the one or more resource elements.

In some examples, UE 115-*b* may identify one or more time locations of the physical broadcast channel transmission and specific to the terrestrial characteristic of the cell. In some cases, each of the one or more time locations includes a location of a subframe or a slot within a radio frame specific to the terrestrial characteristic of the cell. In some cases, the location of the subframe or the slot for each of the one or more time locations includes an absolute location specific to the terrestrial characteristic of the cell. In some examples, the one or more time locations of the physical broadcast channel transmission is specific to a duplexing mode for the cell.

In some examples, the broadcast signaling may include a MIB transmission that identifies the terrestrial characteristic of the cell. In some examples, the indication of the terrestrial characteristic of the cell corresponds to a bit field of the MIB transmission that indicates the terrestrial characteristic. In some examples, the MIB transmission may indicate one out of a set of one or more deployment modes, where the deployment modes of the set are specific to the terrestrial characteristic.

In some examples, UE 115-*b* may determine that the cell of device 402 is a target for camping by the UE based on the terrestrial characteristic of the cell (e.g., UE 115-*b* may determine that device 402 is a terrestrial cell). In some examples, UE 115-*b* may camp on the cell based on the determining.

At 420, device 402 may initiate communications with UE 115-*b* based on the broadcast signaling identifying the terrestrial characteristic of the cell. In some examples, the indication of the terrestrial characteristic of the cell corresponds to a bit field of the master information block transmission that indicates the terrestrial characteristic. In some examples, the master information block transmission may indicate one out of a set of one or more deployment modes, where the deployment modes of the set are specific to the terrestrial characteristic.

Figure 5:
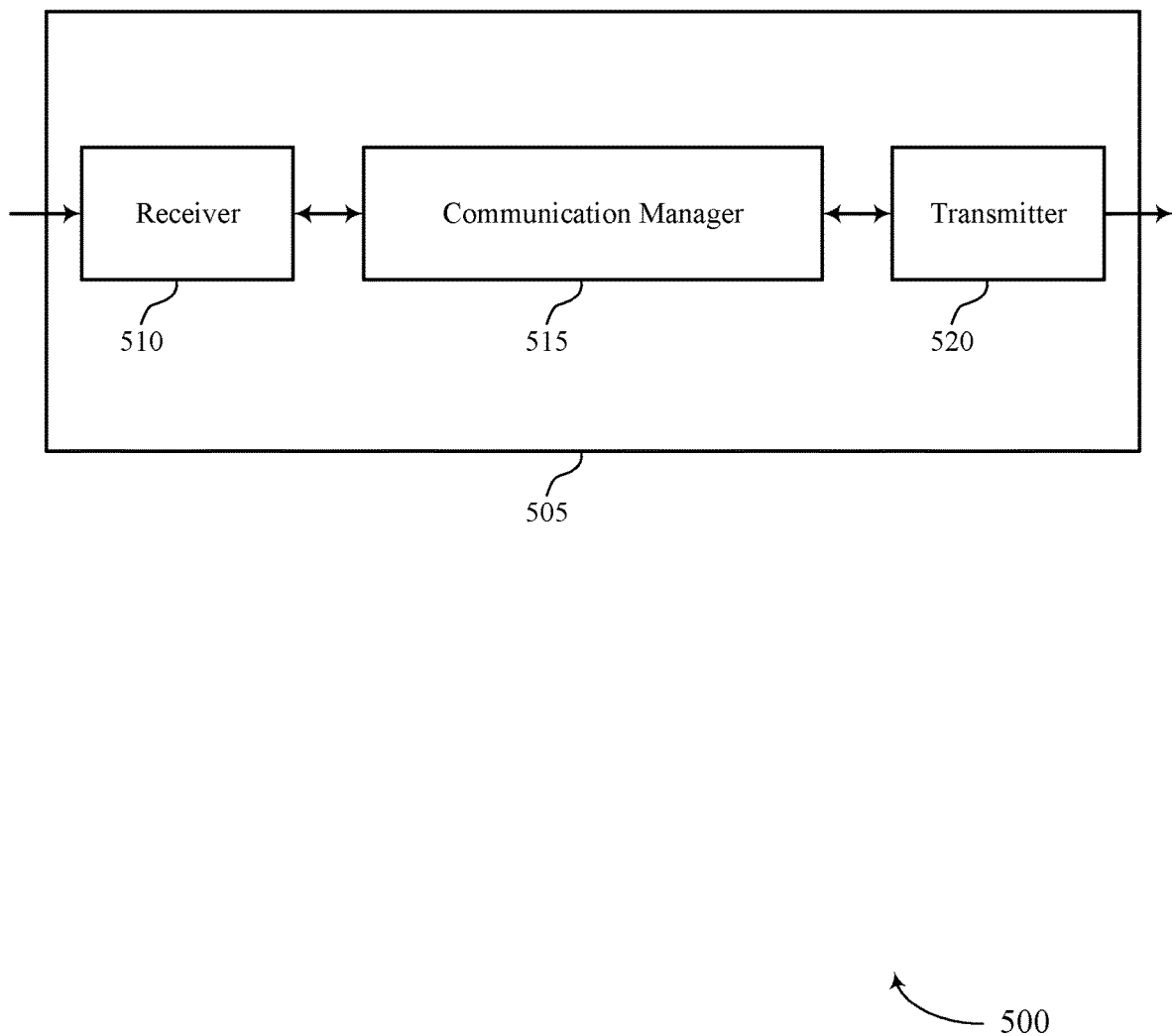
FIGS. 5 and 6 show block diagrams of devices that support differentiation of terrestrial and non-terrestrial cells in accordance with aspects of the present disclosure.

FIG. 5 shows a block diagram 500 of a device 505 that supports differentiation of terrestrial and non-terrestrial cells in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to differentiation of terrestrial and non-terrestrial cells, etc.). Information may be passed on to other components of the device 505. The receiver 510 may be an example of aspects of the transceiver 815 described with reference to FIG. 8. The receiver 510 may utilize a single antenna or a set of one or more antennas.

The communication manager 515 may perform a synchronization procedure with a cell and receive, as part of the synchronization procedure, broadcast signaling associated with the cell, where the broadcast signaling identifies a terrestrial characteristic of the cell. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of one or more antennas.

By including or configuring the communication manager 515 in accordance with examples as described herein, the device 505 (e.g., a processor controlling or otherwise coupled to the receiver 510, the transmitter 520, the communication manager 515, or a combination thereof) may support techniques for a device 505 to differentiate between a terrestrial network and a non-terrestrial network. By differentiating between the terrestrial network and the non-terrestrial network, the device 505 may select to refrain from camping on a cell of a network which the UE is not configured to communicate with.

Figure 6:
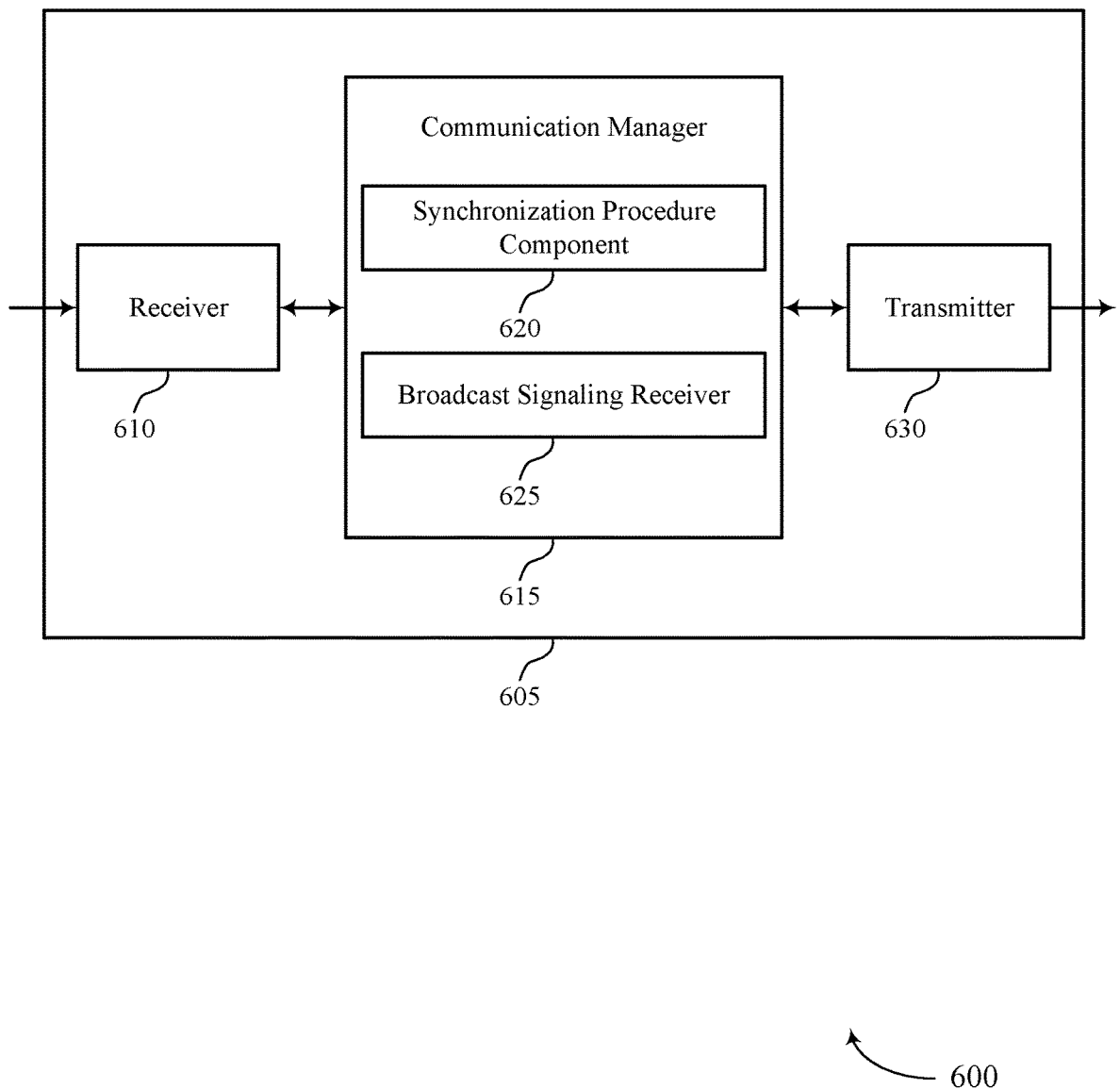

FIG. 6 shows a block diagram 600 of a device 605 that supports differentiation of terrestrial and non-terrestrial cells in accordance with aspects of the present disclosure. The device 605 may be an example of aspects of a device 505, or a UE 115 as described herein. The device 605 may include a receiver 610, a communication manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to differentiation of terrestrial and non-terrestrial cells, etc.). Information may be passed on to other components of the device 605. The receiver 610 may be an example of aspects of the transceiver 815 described with reference to FIG. 8. The receiver 610 may utilize a single antenna or a set of one or more antennas.

The communication manager 615 may be an example of aspects of the communication manager 515 as described herein. The communication manager 615 may include a synchronization procedure component 620 and a broadcast signaling receiver 625. The communication manager 615 may be an example of aspects of the communication manager 810 described herein.

The synchronization procedure component 620 may perform a synchronization procedure with a cell.

The broadcast signaling receiver 625 may receive, as part of the synchronization procedure, broadcast signaling associated with the cell, where the broadcast signaling identifies a terrestrial characteristic of the cell.

The transmitter 630 may transmit signals generated by other components of the device 605. In some examples, the transmitter 630 may be collocated with a receiver 610 in a transceiver module. For example, the transmitter 630 may be an example of aspects of the transceiver 815 described with reference to FIG. 8. The transmitter 630 may utilize a single antenna or a set of one or more antennas.

Figure 7:
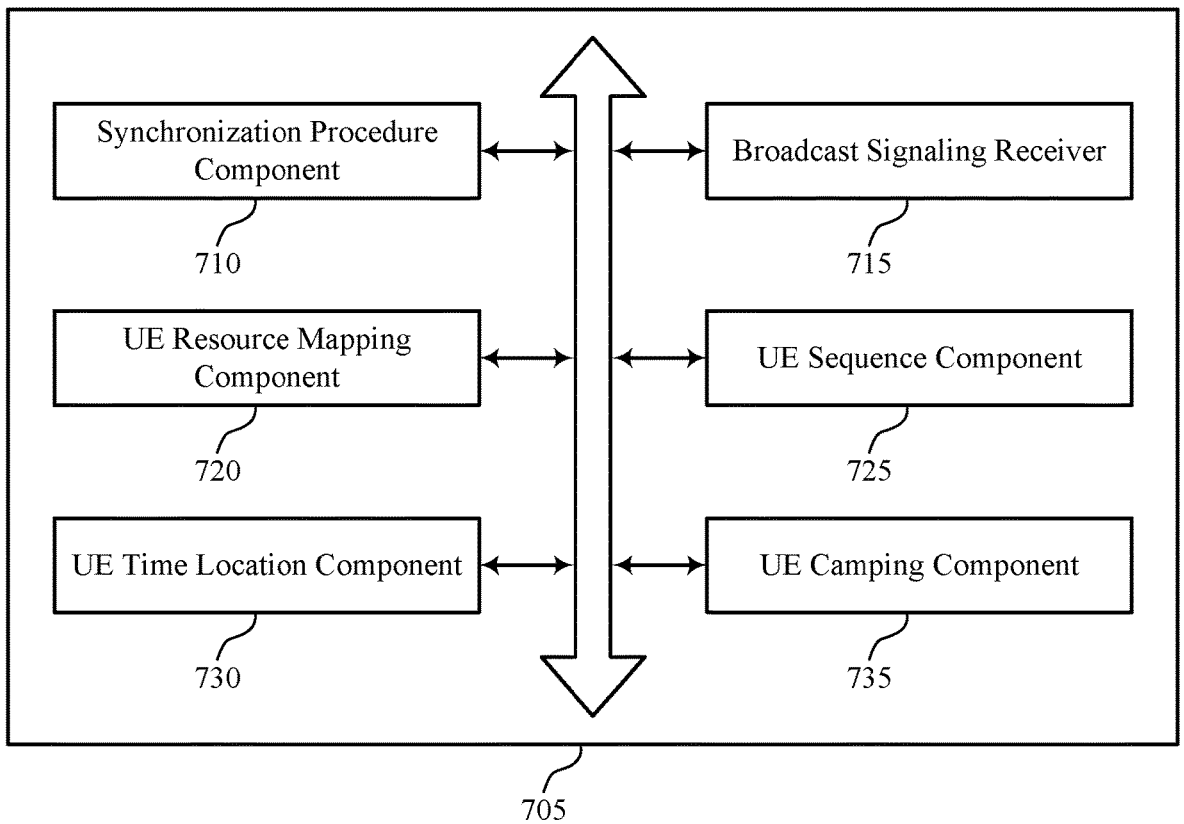
FIG. 7 shows a block diagram of a communication manager that supports differentiation of terrestrial and non-terrestrial cells in accordance with aspects of the present disclosure.

FIG. 7 shows a block diagram 700 of a communication manager 705 that supports differentiation of terrestrial and non-terrestrial cells in accordance with aspects of the present disclosure. The communication manager 705 may be an example of aspects of a communication manager 515, a communication manager 615, or a communication manager 810 described herein. The communication manager 705 may include a synchronization procedure component 710, a broadcast signaling receiver 715, an UE resource mapping component 720, an UE sequence component 725, an UE time location component 730, and an UE camping component 735. Each of these modules may communicate, directly or indirectly, with one another (e.g., via one or more buses).

The synchronization procedure component 710 may perform a synchronization procedure with a cell. In some cases, the cell includes a narrowband cell (NCell).

The broadcast signaling receiver 715 may receive, as part of the synchronization procedure, broadcast signaling associated with the cell, where the broadcast signaling identifies a terrestrial characteristic of the cell. In some examples, the broadcast signaling receiver 715 receiving the broadcast signaling may involve broadcast signaling receiver 715 receiving at least one synchronization signal that identifies the terrestrial characteristic of the cell. In some examples, the at least one synchronization signal may include a primary synchronization signal, a secondary synchronization signal, or both. In some examples, the primary synchronization signal may include a narrowband primary synchronization signal, the secondary synchronization signal may include a narrowband secondary synchronization signal, or both.

In some examples, the broadcast signaling receiver 715 may receive a physical broadcast channel transmission that identifies the terrestrial characteristic of the cell. In some cases, the physical broadcast channel transmission includes a narrowband physical broadcast channel transmission. In some examples, the broadcast signaling receiver 715 may receive a master information block transmission that identifies the terrestrial characteristic of the cell. In some examples, the indication of the terrestrial characteristic of the cell corresponds to a bit field of the master information block transmission that indicates the terrestrial characteristic. In some examples, the master information block transmission may indicate one out of a set of one or more deployment modes, where the deployment modes of the set are specific to the terrestrial characteristic. In some examples, the terrestrial characteristic may indicate whether cell is associated with a terrestrial network or a non-terrestrial network.

The UE resource mapping component 720 may identify a resource mapping configuration for the at least one synchronization signal, where the resource mapping configuration is specific to the terrestrial characteristic of the cell. In some examples, the terrestrial characteristic of the cell may correspond to a number of symbols in a subframe or a slot associated with the resource mapping configuration for the at least one synchronization signal. In some such examples, the UE resource mapping component 720 may identify that the cell is associated with a non-terrestrial network based on the number of symbols in the subframe or the slot being above a threshold number. In some examples, the terrestrial characteristic of the cell corresponds to whether one or more resources of the resource mapping configuration map to a set of one or more starting symbols of a subframe or a slot associated with a control region for terrestrial communications. In some such examples, the UE resource mapping component 720 may identify that the cell is associated with a non-terrestrial network based on at least one of the one or more resources of the resource mapping being mapped to the set of one or more starting symbols.

In some examples, the UE resource mapping component 720 may identify a resource mapping configuration for the physical broadcast channel transmission, where the resource mapping configuration is specific to the terrestrial characteristic of the cell. In some examples, the terrestrial characteristic of the cell may correspond to a number of symbols in a subframe or slot associated with the resource mapping configuration for the physical broadcast channel transmission. In some such examples, the UE resource mapping component 720 may identify that the cell is associated with a non-terrestrial network based on the number of symbols in the subframe or the slot being above a threshold number. In some examples, the terrestrial characteristic of the cell may correspond to whether one or more resources of the resource mapping configuration map to a set of one or more starting symbols of a subframe or a slot associated with a control region for terrestrial communications. In some such examples, the UE resource mapping component 720 may identify that the cell is associated with a non-terrestrial network based on the one or more resources of the resource mapping configured being mapped to the set of one or more starting symbols. In some examples, the terrestrial characteristic of the cell may correspond to whether one or more resources of the resource mapping configuration map to one or more resource elements associated with communicating a cell-specific reference signal in terrestrial communications. In some such examples, the UE resource mapping component 720 may identify that the cell is associated with a non-terrestrial network based on the one or more resources of the resource mapping configuration being mapped to the one or more resource elements.

The UE sequence component 725 may identify at least one of a base sequence, a Zadoff-Chu root, a scrambling sequence, a binary sequence, a cover-code, a cyclic shift associated with the at least one synchronization signal and specific to the terrestrial characteristic of the cell. In some examples, the UE sequence component 725 may identify a scrambling sequence associated with the physical broadcast channel transmission and specific to the terrestrial characteristic of the cell.

The UE time location component 730 may identify one or more time locations of the at least one synchronization signal and specific to the terrestrial characteristic of the cell. In some cases, each of the one or more time locations includes a location of a subframe or a slot within a radio frame and specific to the terrestrial characteristic of the cell. In some cases, the location of the subframe or the slot for each of the one or more time locations includes an absolute location specific to the terrestrial characteristic of the cell or a relative location among the at least one synchronization signal and specific to the terrestrial characteristic of the cell. In some examples, the one or more time locations of the at least one synchronization signal are specific to a duplexing mode for the cell. In some examples, the UE time location component 730 may identify one or more time locations of the physical broadcast channel transmission and specific to the terrestrial characteristic of the cell. In some cases, each of the one or more time locations includes a location of a subframe or a slot within a radio frame specific to the terrestrial characteristic of the cell. In some cases, the location of the subframe or the slot for each of the one or more time locations includes an absolute location specific to the terrestrial characteristic of the cell. In some examples, the one or more time locations of the physical broadcast channel transmission is specific to a duplexing mode for the cell.

The UE camping component 735 may determine that the cell of the base station is a target for camping by the UE based on the terrestrial characteristic of the cell. In some examples, the UE camping component 735 may camp on the cell based on the determining.

Figure 8:
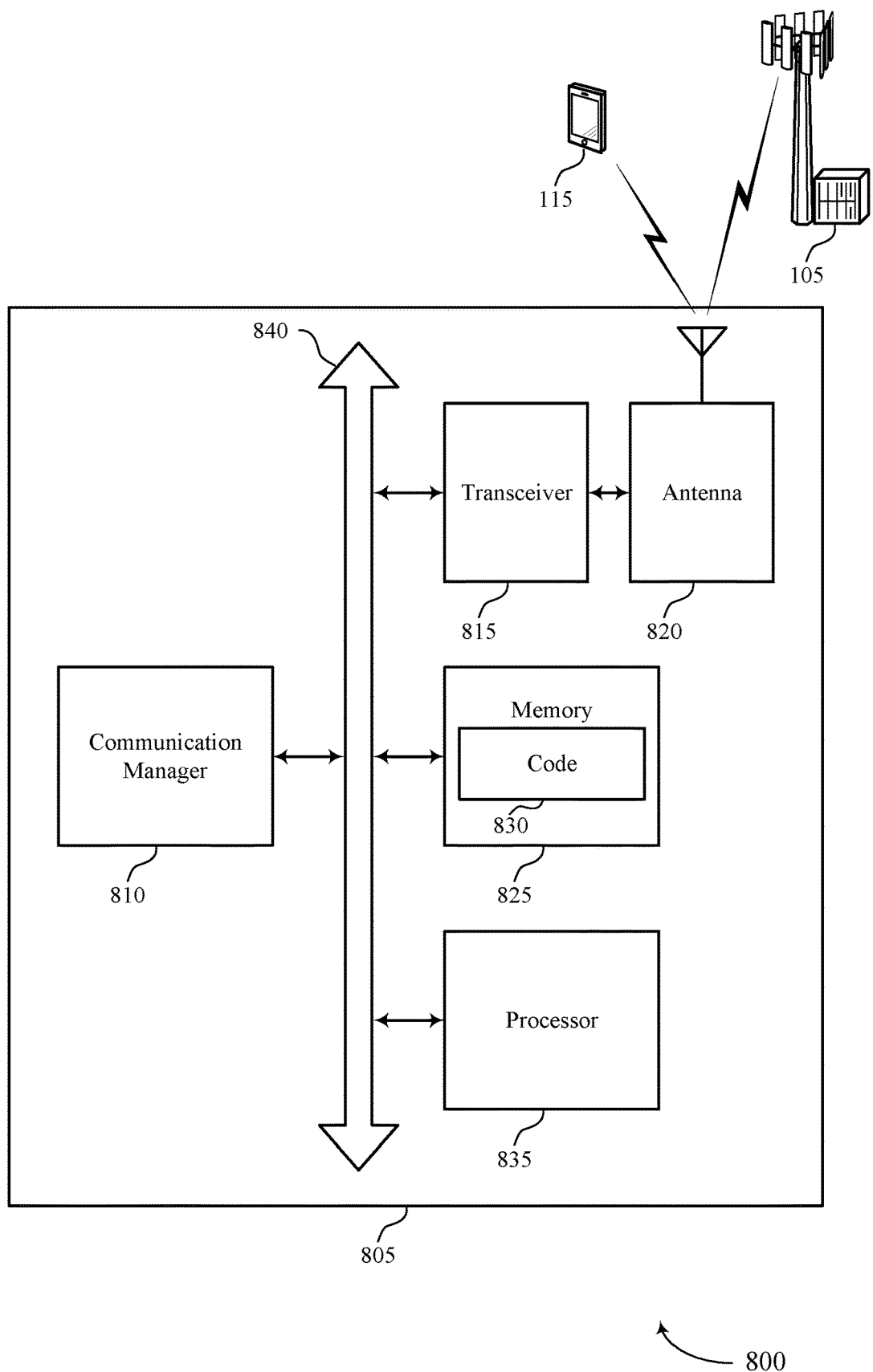
FIG. 8 shows a diagram of a system including a device that supports differentiation of terrestrial and non-terrestrial cells in accordance with aspects of the present disclosure.

FIG. 8 shows a diagram of a system 800 including a device 805 that supports differentiation of terrestrial and non-terrestrial cells in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may perform a synchronization procedure with a cell and receive, as part of the synchronization procedure, broadcast signaling associated with the cell, where the broadcast signaling identifies a terrestrial characteristic of the cell.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting differentiation of terrestrial and non-terrestrial cells).

By including or configuring the communication manager 810 in accordance with examples as disclosed herein, the device 805 may support techniques for the device 805 to differentiate between a terrestrial network and a non-terrestrial network. By differentiating between the terrestrial network and the non-terrestrial network, the device 805 may select to refrain from camping on a cell of a network which the UE is not configured to communicate with.

Figure 9:
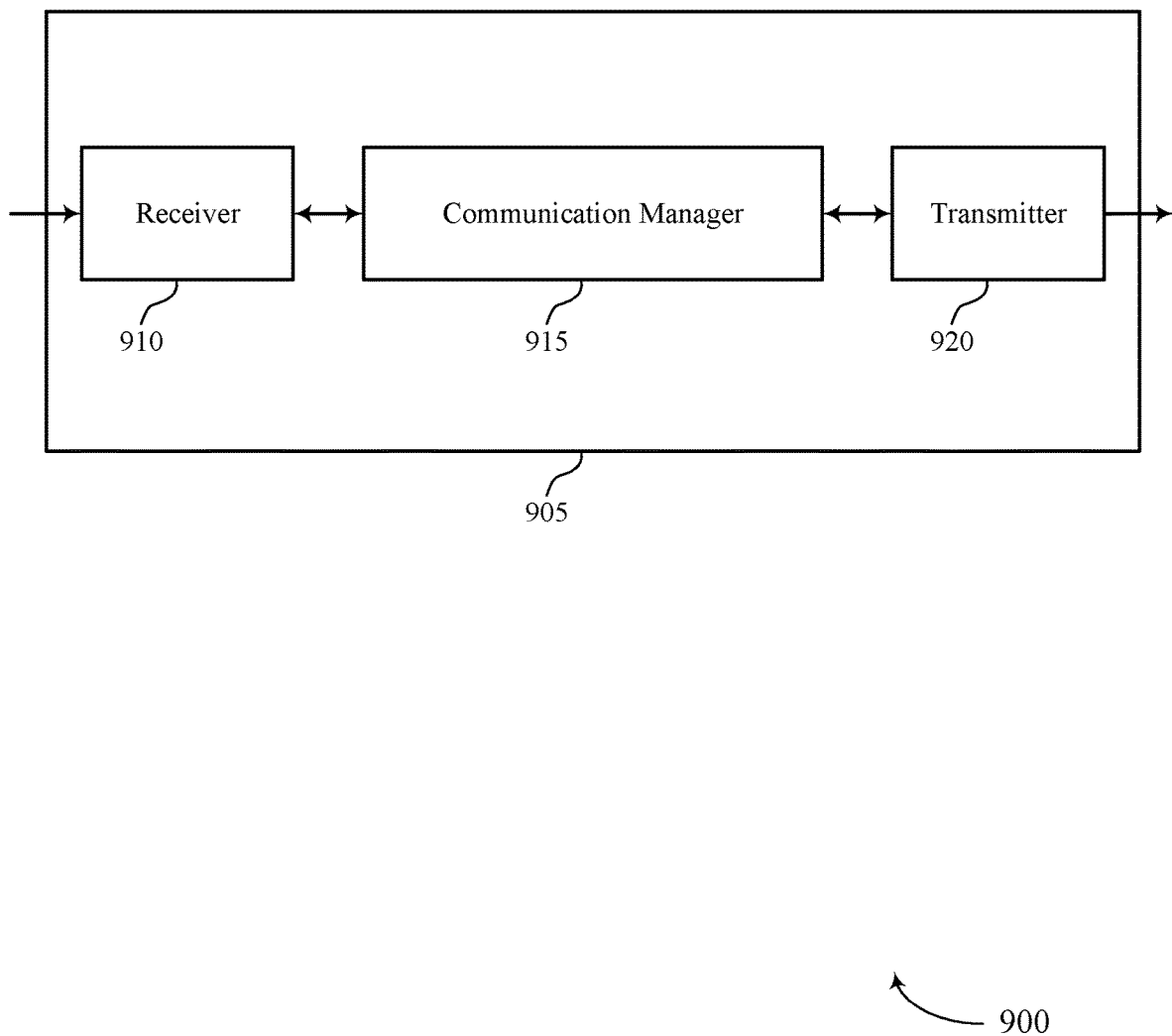
FIGS. 9 and 10 show block diagrams of devices that support differentiation of terrestrial and non-terrestrial cells in accordance with aspects of the present disclosure.

FIG. 9 shows a block diagram 900 of a device 905 that supports differentiation of terrestrial and non-terrestrial cells in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to differentiation of terrestrial and non-terrestrial cells, etc.). Information may be passed on to other components of the device 905. The receiver 910 may be an example of aspects of the transceiver 1220 described with reference to FIG. 12. The receiver 910 may utilize a single antenna or a set of one or more antennas.

The communication manager 915 may determine a terrestrial characteristic of a cell associated with the base station; transmit broadcast signaling associated with the cell, where the broadcast signaling identifies the terrestrial characteristic of the cell; and initiate communications with a UE based on the broadcast signaling identifying the terrestrial characteristic of the cell. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of one or more antennas.

By including or configuring the communication manager 915 in accordance with examples as described herein, the device 905 (e.g., a processor controlling or otherwise coupled to the receiver 910, the transmitter 920, the communication manager 915, or a combination thereof) may support techniques for a device 905 to enable a UE to differentiate between a terrestrial network and a non-terrestrial network. By enabling the UE to differentiate between the terrestrial network and the non-terrestrial network, the device 905 may enable the UE to refrain from camping on a cell of a network which the UE is not configured to communicate with.

Figure 10:
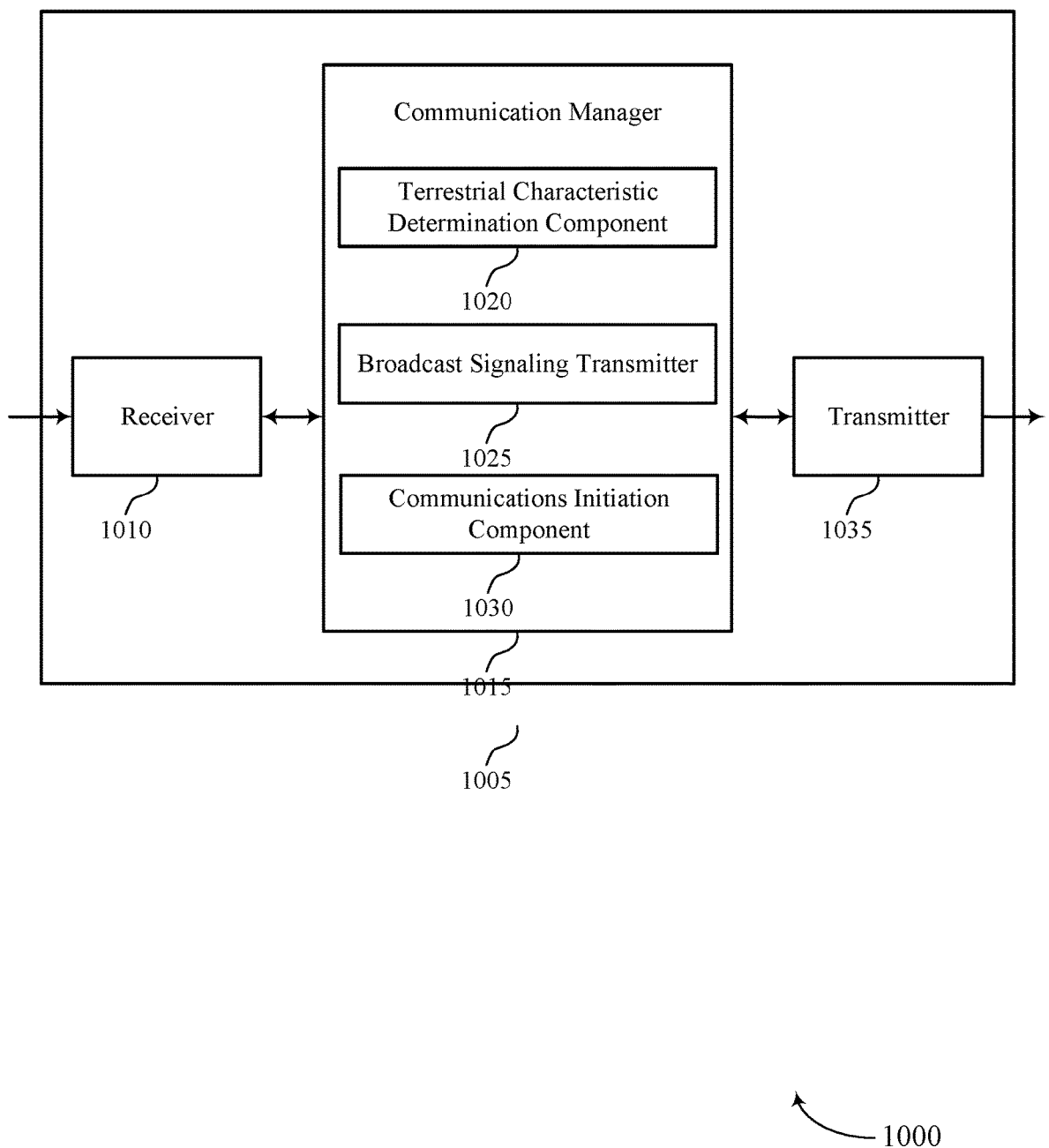

FIG. 10 shows a block diagram 1000 of a device 1005 that supports differentiation of terrestrial and non-terrestrial cells in accordance with aspects of the present disclosure. The device 1005 may be an example of aspects of a device 905, or a base station 105 as described herein. The device 1005 may include a receiver 1010, a communication manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to differentiation of terrestrial and non-terrestrial cells, etc.). Information may be passed on to other components of the device 1005. The receiver 1010 may be an example of aspects of the transceiver 1220 described with reference to FIG. 12. The receiver 1010 may utilize a single antenna or a set of one or more antennas.

The communication manager 1015 may be an example of aspects of the communication manager 915 as described herein. The communication manager 1015 may include a terrestrial characteristic determination component 1020, a broadcast signaling transmitter 1025, and a communications initiation component 1030. The communication manager 1015 may be an example of aspects of the communication manager 1210 described herein.

The terrestrial characteristic determination component 1020 may determine a terrestrial characteristic of a cell associated with the base station.

The broadcast signaling transmitter 1025 may transmit broadcast signaling associated with the cell, where the broadcast signaling identifies the terrestrial characteristic of the cell.

The communications initiation component 1030 may initiate communications with a UE based on the broadcast signaling identifying the terrestrial characteristic of the cell.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of one or more antennas.

Figure 11:
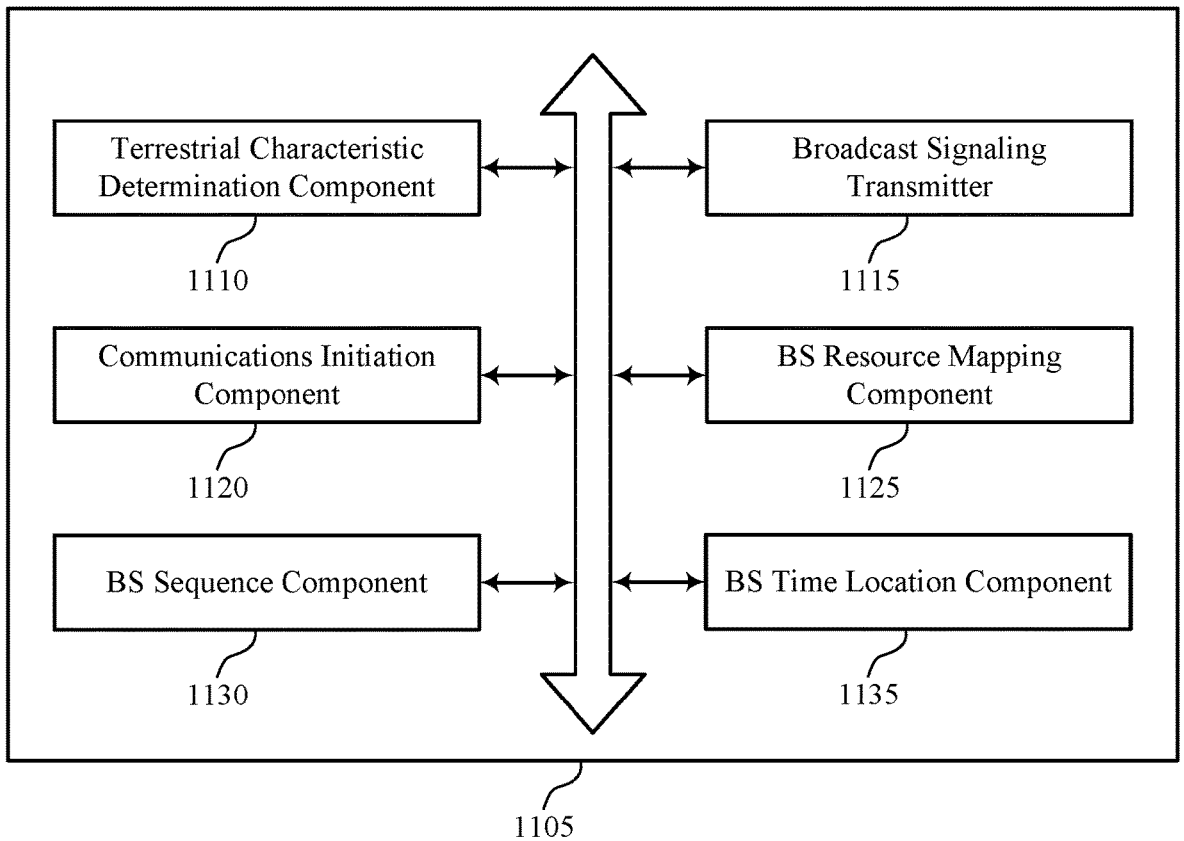
FIG. 11 shows a block diagram of a communication manager that supports differentiation of terrestrial and non-terrestrial cells in accordance with aspects of the present disclosure.

FIG. 11 shows a block diagram 1100 of a communication manager 1105 that supports differentiation of terrestrial and non-terrestrial cells in accordance with aspects of the present disclosure. The communication manager 1105 may be an example of aspects of a communication manager 915, a communication manager 1015, or a communication manager 1210 described herein. The communication manager 1105 may include a terrestrial characteristic determination component 1110, a broadcast signaling transmitter 1115, a communications initiation component 1120, a BS resource mapping component 1125, a BS sequence component 1130, and a BS time location component 1135. Each of these modules may communicate, directly or indirectly, with one another (e.g., via one or more buses).

The terrestrial characteristic determination component 1110 may determine a terrestrial characteristic of a cell associated with the base station. In some examples, the terrestrial characteristic indicates whether the cell is associated with a terrestrial network or a non-terrestrial network. In some cases, the cell includes a narrowband cell (NCell).

The broadcast signaling transmitter 1115 may transmit broadcast signaling associated with the cell, where the broadcast signaling identifies the terrestrial characteristic of the cell.

In some examples, the broadcast signaling transmitter 1115 may transmit at least one synchronization signal that identifies the terrestrial characteristic of the cell. In some cases, the at least one synchronization signal includes a primary synchronization signal, a secondary synchronization signal, or both. In some cases, the primary synchronization signal includes a narrowband primary synchronization signal, the secondary synchronization signal includes a narrowband secondary synchronization signal, or both.

In some examples, the broadcast signaling transmitter 1115 may transmit a physical broadcast channel transmission that identifies the terrestrial characteristic of the cell. In some cases, the physical broadcast channel transmission includes a narrowband physical broadcast channel transmission. In some examples, the broadcast signaling transmitter 1115 may transmit a master information block transmission that identifies the terrestrial characteristic of the cell. The indication of the terrestrial characteristic of the cell may correspond to a bit field of the master information block transmissions that indicates the terrestrial characteristic. In some examples, the master information block transmission may indicate one out of a set of one or more deployment modes, where the deployment modes of the set are specific to the terrestrial characteristic.

The communications initiation component 1120 may initiate communications with a UE based on the broadcast signaling identifying the terrestrial characteristic of the cell.

The BS resource mapping component 1125 may identify a resource mapping configuration for the at least one synchronization signal, where the resource mapping configuration is specific to the terrestrial characteristic of the cell, and where transmitting the at least one synchronization signal is based on the determined resource mapping configuration. In some examples, the terrestrial characteristic of the cell corresponds to a number of symbols in a subframe or a slot associated with the resource mapping configuration for the at least one synchronization signal. In some example, the terrestrial characteristic of the cell corresponds to whether one or more resources of the resource mapping configuration map to a set of one or more starting symbols of a subframe or a slot associated with a control region for terrestrial communications.

In some examples, the BS resource mapping component 1125 may identify a resource mapping configuration for the physical broadcast channel transmission, where the resource mapping configuration is specific to the terrestrial characteristic of the cell, and where transmitting the physical broadcast channel transmission is based on the determined resource mapping configuration. In some examples, the terrestrial characteristic of the cell may correspond to a number of symbols in a subframe or a slot associated with the resource mapping configuration for the physical broadcast channel transmission. In some examples, the terrestrial characteristic of the cell may correspond to whether one or more resources of the resource mapping configuration map to a set of one or more starting symbols of a subframe or a slot associated with a control region for terrestrial communications. In some examples, the terrestrial characteristic of the cell corresponds to whether one or more resources of the resource mapping configuration map to one or more resource elements associated with communicating a cell-specific reference signal in terrestrial communications.

The BS sequence component 1130 may identify at least one of a base sequence, a Zadoff-Chu root, a scrambling sequence, a binary sequence, a cover-code, a cyclic shift associated with the at least one synchronization signal and specific to the terrestrial characteristic of the cell, where transmitting the at least one synchronization signal is based on the determined at least one of the base sequence, the Zadoff-Chu root, the scrambling sequence, the binary sequence, the cover-code, or the cyclic shift. In some examples, the BS sequence component 1130 may identify a scrambling sequence associated with the physical broadcast channel transmission and specific to the terrestrial characteristic of the cell, where transmitting the physical broadcast channel transmission is based on the determined scrambling sequence.

The BS time location component 1135 may identify one or more time locations of the at least one synchronization signal and specific to the terrestrial characteristic of the cell, where transmitting the at least one synchronization signal is based on the determined one or more time locations. In some cases, each of the one or more time locations includes a location of a subframe or a slot within a radio frame specific to the terrestrial characteristic of the cell. In some cases, the location of the subframe or the slot for each of the one or more time locations includes an absolute location specific to the terrestrial characteristic of the cell or a relative location among the at least one synchronization signal and specific to the terrestrial characteristic of the cell. The one or more time locations of the at least one synchronization signal are specific to a duplexing mode for the cell.

In some examples, the BS time location component 1135 may identify one or more time locations of the physical broadcast channel transmission and specific to the terrestrial characteristic of the cell. In some cases, each of the one or more time locations includes a location of a subframe or a slot within a radio frame specific to the terrestrial characteristic of the cell. In some cases, the location of the subframe or the slot for each of the one or more time locations includes an absolute location specific to the terrestrial characteristic of the cell. In some examples, the one or more time locations of the physical broadcast channel transmission is specific to a duplexing mode for the cell.

Figure 12:
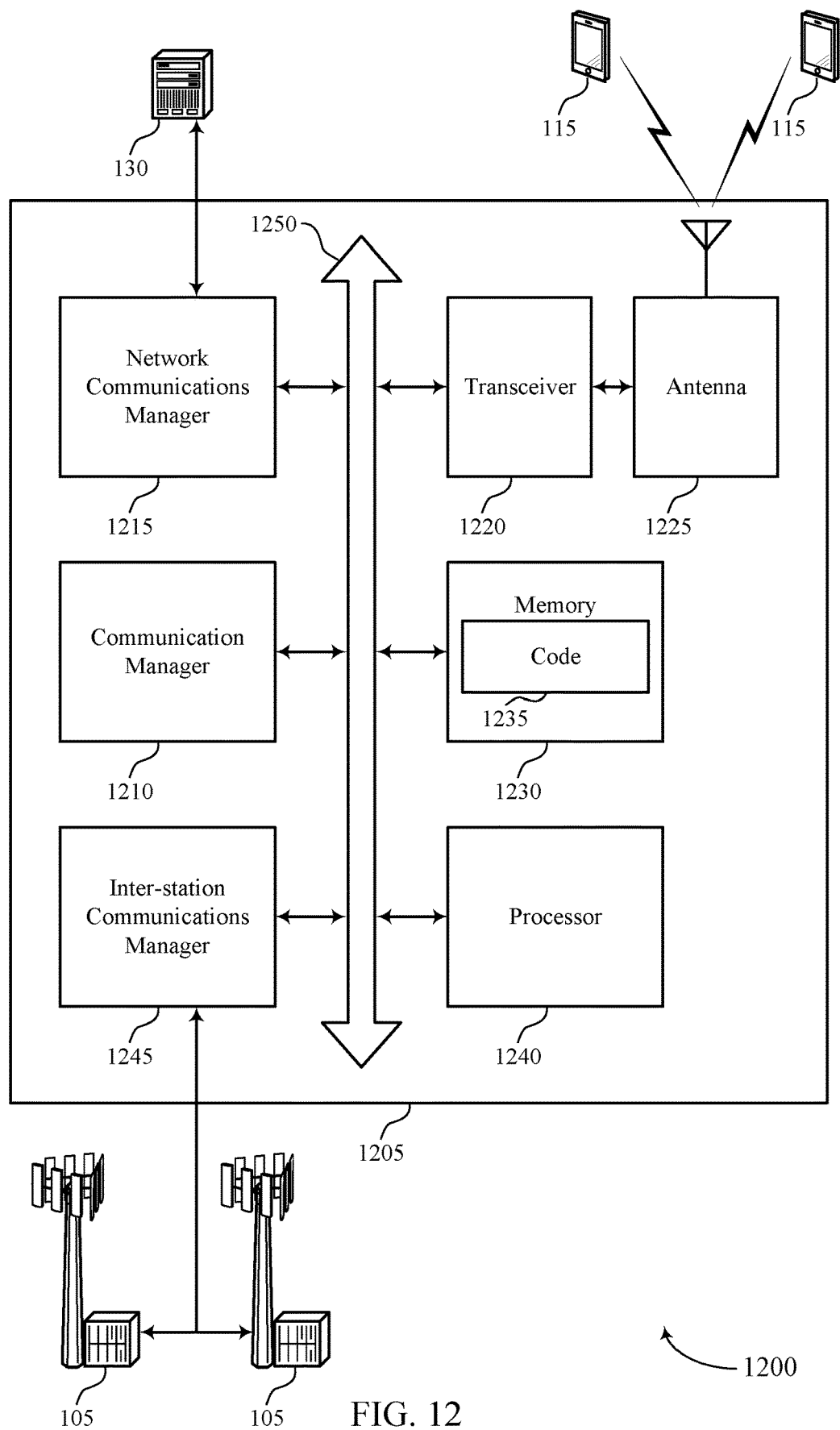
FIG. 12 shows a diagram of a system including a device that supports differentiation of terrestrial and non-terrestrial cells in accordance with aspects of the present disclosure.

FIG. 12 shows a diagram of a system 1200 including a device 1205 that supports differentiation of terrestrial and non-terrestrial cells in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may determine a terrestrial characteristic of a cell associated with the base station; transmit broadcast signaling associated with the cell, where the broadcast signaling identifies the terrestrial characteristic of the cell; and initiate communications with a UE based on the broadcast signaling identifying the terrestrial characteristic of the cell.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting differentiation of terrestrial and non-terrestrial cells).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

By including or configuring the communication manager 1210 in accordance with examples as disclosed herein, the device 1205 may support techniques for to enable a UE to differentiate between a terrestrial network and a non-terrestrial network. By enabling the UE to differentiate between the terrestrial network and the non-terrestrial network, the device 905 may enable the UE to refrain from camping on a cell of a network which the UE is not configured to communicate with.

Figure 13:
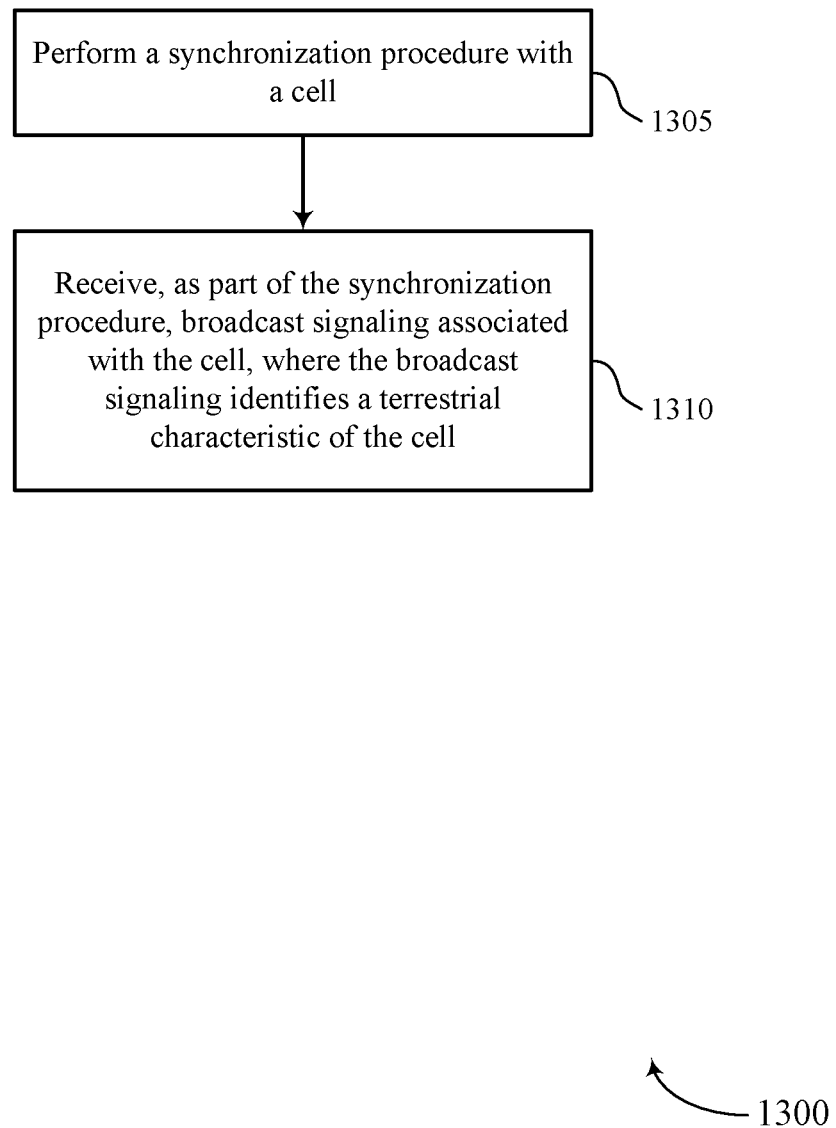
FIGS. 13 through 17 show flowcharts illustrating methods that support differentiation of terrestrial and non-terrestrial cells in accordance with aspects of the present disclosure.

FIG. 13 shows a flowchart illustrating a method 1300 that supports differentiation of terrestrial and non-terrestrial cells in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of one or more instructions to control the functional elements of the UE to perform the described functions. Additionally or alternatively, a UE may perform aspects of the described functions using special-purpose hardware.

At 1305, the UE may perform a synchronization procedure with a cell. The operations of 1305 may be performed according to the methods described herein. In some examples, aspects of the operations of 1305 may be performed by a synchronization procedure component as described with reference to FIGS. 5 through 8.

At 1310, the UE may receive, as part of the synchronization procedure, broadcast signaling associated with the cell, where the broadcast signaling identifies a terrestrial characteristic of the cell. The operations of 1310 may be performed according to the methods described herein. In some examples, aspects of the operations of 1310 may be performed by a broadcast signaling receiver as described with reference to FIGS. 5 through 8.

Figure 14:
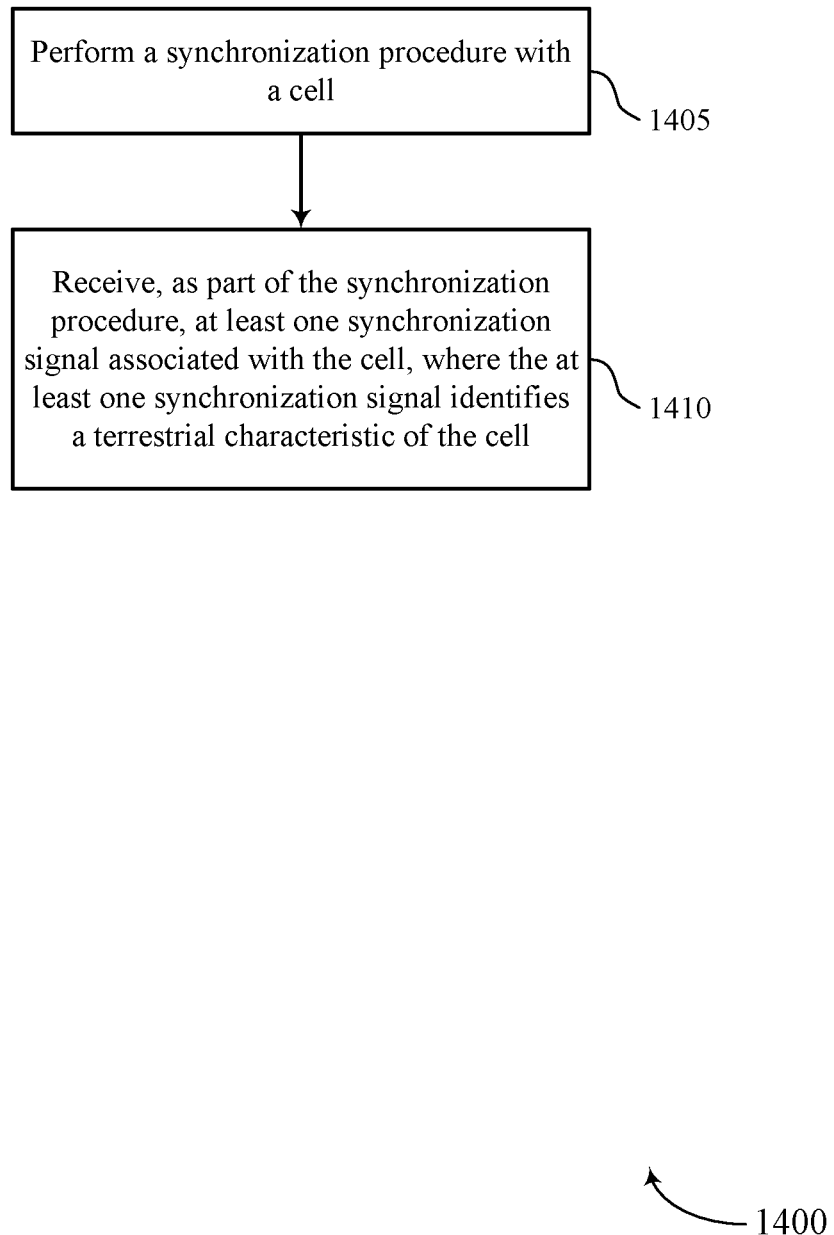

FIG. 14 shows a flowchart illustrating a method 1400 that supports differentiation of terrestrial and non-terrestrial cells in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of one or more instructions to control the functional elements of the UE to perform the described functions. Additionally or alternatively, a UE may perform aspects of the described functions using special-purpose hardware.

At 1405, the UE may perform a synchronization procedure with a cell. The operations of 1405 may be performed according to the methods described herein. In some examples, aspects of the operations of 1405 may be performed by a synchronization procedure component as described with reference to FIGS. 5 through 8.

At 1410, the UE may receive, as part of the synchronization procedure, at least one synchronization signal associated with the cell, where the at least one synchronization signal identifies a terrestrial characteristic of the cell. The operations of 1410 may be performed according to the methods described herein. In some examples, aspects of the operations of 1410 may be performed by a broadcast signaling receiver as described with reference to FIGS. 5 through 8.

Figure 15:
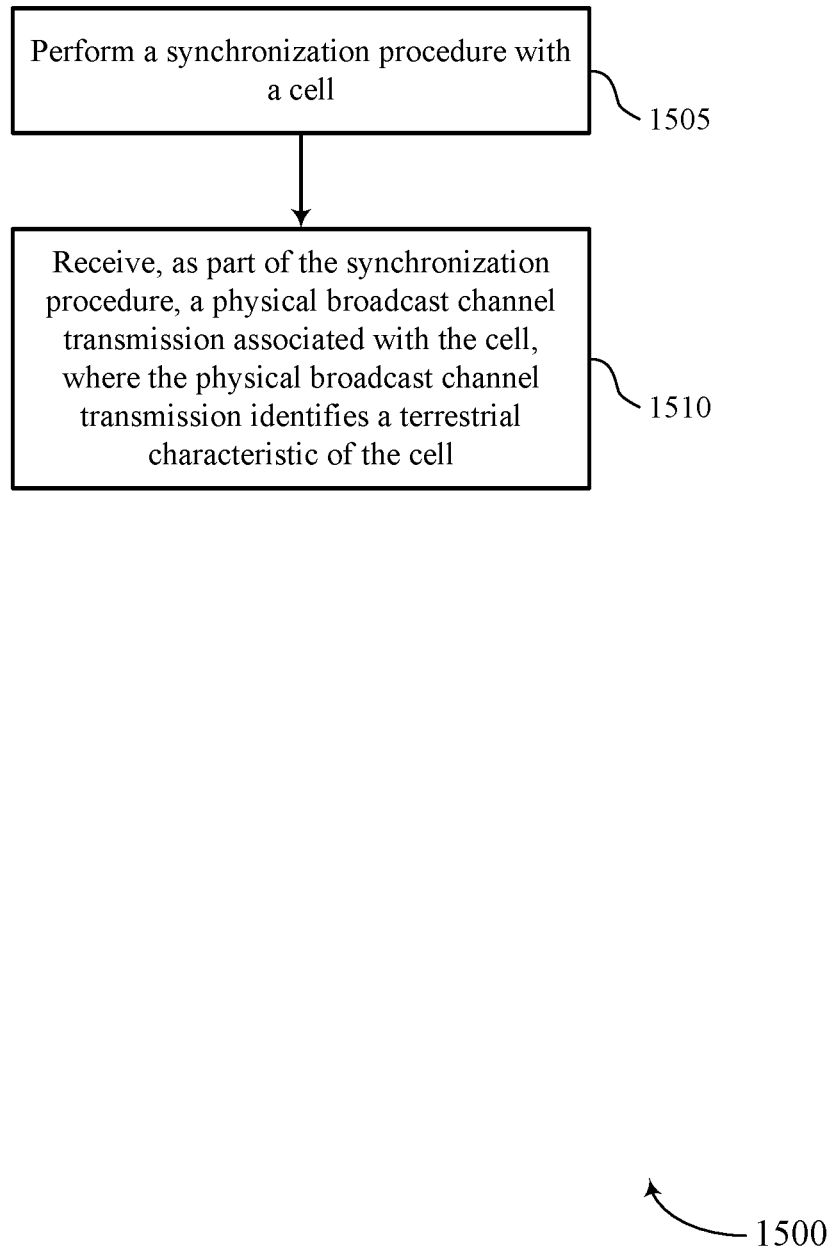

FIG. 15 shows a flowchart illustrating a method 1500 that supports differentiation of terrestrial and non-terrestrial cells in accordance with aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of one or more instructions to control the functional elements of the UE to perform the described functions. Additionally or alternatively, a UE may perform aspects of the described functions using special-purpose hardware.

At 1505, the UE may perform a synchronization procedure with a cell. The operations of 1505 may be performed according to the methods described herein. In some examples, aspects of the operations of 1505 may be performed by a synchronization procedure component as described with reference to FIGS. 5 through 8.

At 1510, the UE may receive, as part of the synchronization procedure, a physical broadcast channel transmission associated with the cell, where the physical broadcast channel transmission identifies a terrestrial characteristic of the cell. The operations of 1510 may be performed according to the methods described herein. In some examples, aspects of the operations of 1510 may be performed by a broadcast signaling receiver as described with reference to FIGS. 5 through 8.

Figure 16:
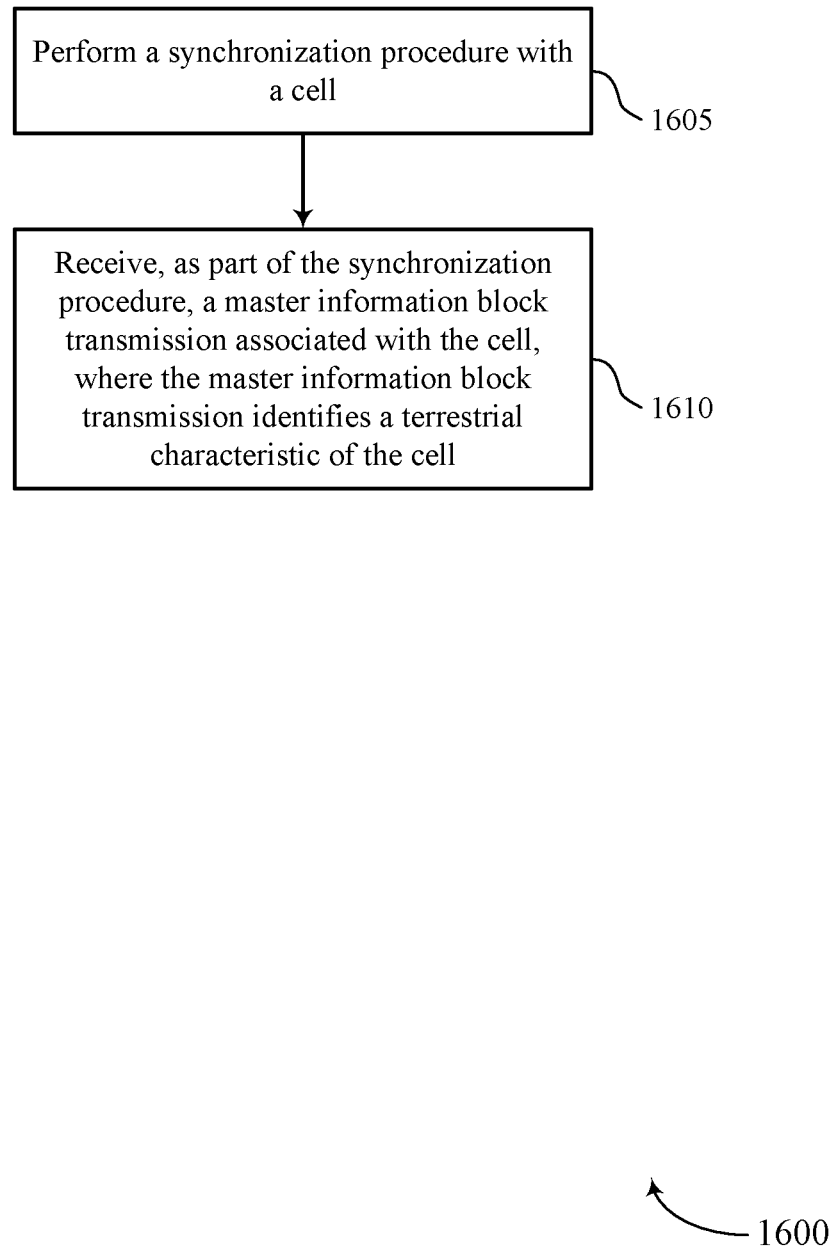

FIG. 16 shows a flowchart illustrating a method 1600 that supports differentiation of terrestrial and non-terrestrial cells in accordance with aspects of the present disclosure. The operations of method 1600 may be implemented by a UE 115 or its components as described herein. For example, the operations of method 1600 may be performed by a communication manager as described with reference to FIGS. 5 through 8. In some examples, a UE may execute a set of one or more instructions to control the functional elements of the UE to perform the described functions. Additionally or alternatively, a UE may perform aspects of the described functions using special-purpose hardware.

At 1605, the UE may perform a synchronization procedure with a cell. The operations of 1605 may be performed according to the methods described herein. In some examples, aspects of the operations of 1605 may be performed by a synchronization procedure component as described with reference to FIGS. 5 through 8.

At 1610, the UE may receive, as part of the synchronization procedure, a master information block transmission associated with the cell, where the master information block transmission identifies a terrestrial characteristic of the cell. The operations of 1610 may be performed according to the methods described herein. In some examples, aspects of the operations of 1610 may be performed by a broadcast signaling receiver as described with reference to FIGS. 5 through 8.

Figure 17:
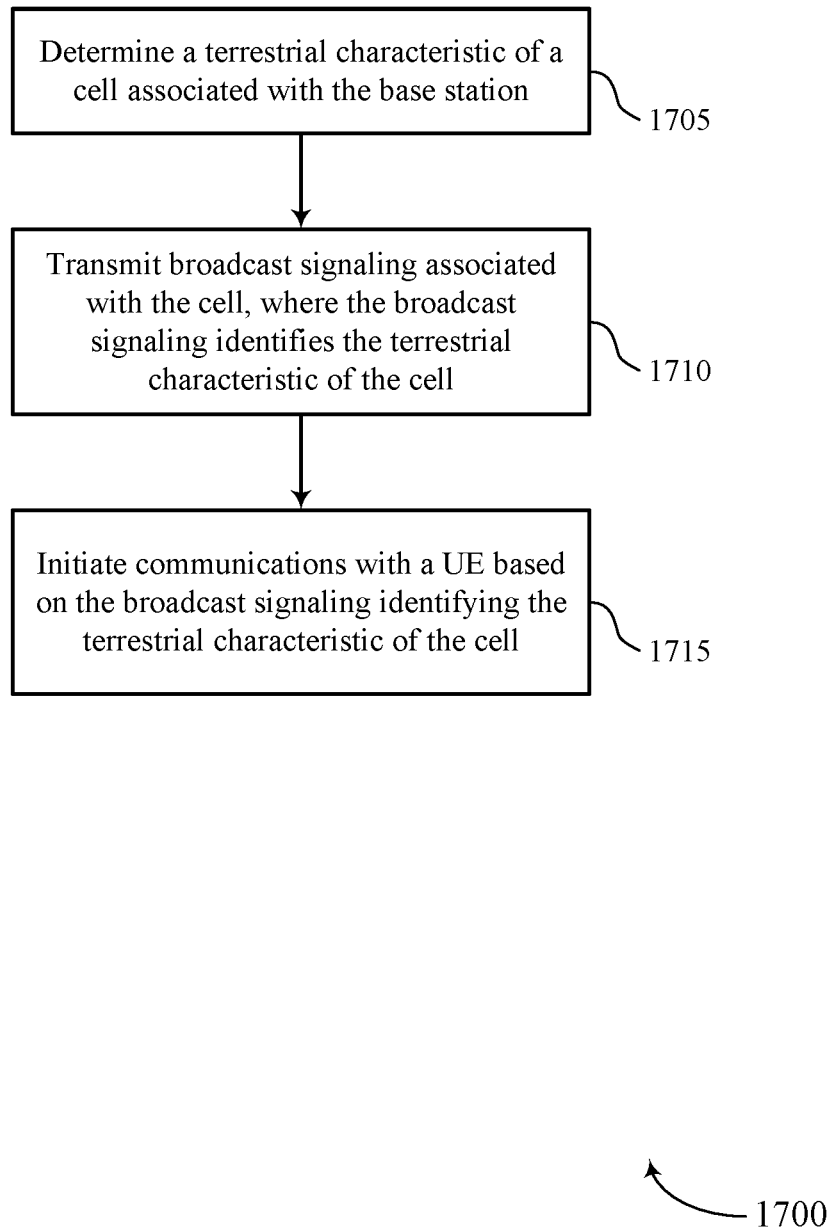

FIG. 17 shows a flowchart illustrating a method 1700 that supports differentiation of terrestrial and non-terrestrial cells in accordance with aspects of the present disclosure. The operations of method 1700 may be implemented by a base station 105 or its components as described herein. For example, the operations of method 1700 may be performed by a communication manager as described with reference to FIGS. 9 through 12. In some examples, a base station may execute a set of one or more instructions to control the functional elements of the base station to perform the described functions. Additionally or alternatively, a base station may perform aspects of the described functions using special-purpose hardware.

At 1705, the base station may determine a terrestrial characteristic of a cell associated with the base station. The operations of 1705 may be performed according to the methods described herein. In some examples, aspects of the operations of 1705 may be performed by a terrestrial characteristic determination component as described with reference to FIGS. 9 through 12.

At 1710, the base station may transmit broadcast signaling associated with the cell, where the broadcast signaling identifies the terrestrial characteristic of the cell. The operations of 1710 may be performed according to the methods described herein. In some examples, aspects of the operations of 1710 may be performed by a broadcast signaling transmitter as described with reference to FIGS. 9 through 12.

At 1715, the base station may initiate communications with a UE based on the broadcast identifying the terrestrial characteristic of the cell. The operations of 1715 may be performed according to the methods described herein. In some examples, aspects of the operations of 1715 may be performed by a undefined as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: performing a synchronization procedure with a cell; and receiving, as part of the synchronization procedure, broadcast signaling associated with the cell, wherein the broadcast signaling identifies a terrestrial characteristic of the cell.

Aspect 2: The method of aspect 1, wherein receiving the broadcast signaling comprises: receiving at least one synchronization signal that identifies the terrestrial characteristic of the cell.

Aspect 3: The method of aspect 2, further comprising: identifying a resource mapping configuration for the at least one synchronization signal, wherein the resource mapping configuration is specific to the terrestrial characteristic of the cell.

Aspect 4: The method of aspect 3, wherein the terrestrial characteristic of the cell corresponds to a number of symbols in a subframe or a slot associated with the resource mapping configuration for the at least one synchronization signal, the method further comprising: identifying that the cell is associated with a non-terrestrial network based at least in part on the number of symbols in the subframe or the slot being above a threshold number.

Aspect 5: The method of any of aspects 3 through 4, wherein the terrestrial characteristic of the cell corresponds to whether one or more resources of the resource mapping configuration map to a set of one or more starting symbols of a subframe or a slot associated with a control region for terrestrial communications, the method further comprising: identifying that the cell is associated with a non-terrestrial network based at least in part on at least one of the one or more resources of the resource mapping configuration being mapped to the set of one or more starting symbols.

Aspect 6: The method of any of aspects 2 through 5, further comprising: identifying at least one of a base sequence, a Zadoff-Chu root, a scrambling sequence, a binary sequence, a cover-code, a cyclic shift associated with the at least one synchronization signal and specific to the terrestrial characteristic of the cell.

Aspect 7: The method of any of aspects 2 through 6, further comprising: identifying one or more time locations of the at least one synchronization signal and specific to the terrestrial characteristic of the cell.

Aspect 8: The method of aspect 7, wherein each of the one or more time locations comprises a location of a subframe or a slot within a radio frame and specific to the terrestrial characteristic of the cell.

Aspect 9: The method of aspect 8, wherein the location of the subframe or the slot for each of the one or more time locations comprises an absolute location specific to the terrestrial characteristic of the cell or a relative location among the at least one synchronization signal and specific to the terrestrial characteristic of the cell.

Aspect 10: The method of any of aspects 7 through 9, wherein the one or more time locations of the at least one synchronization signal are specific to a duplexing mode for the cell.

Aspect 11: The method of any of aspects 2 through 10, wherein the at least one synchronization signal comprises a primary synchronization signal, a secondary synchronization signal, or both.

Aspect 12: The method of aspect 11, wherein the primary synchronization signal comprises a narrowband primary synchronization signal, the secondary synchronization signal comprises a narrowband secondary synchronization signal, or both.

Aspect 13: The method of any of aspects 1 through 12, wherein receiving the broadcast signaling comprises: receiving a physical broadcast channel transmission that identifies the terrestrial characteristic of the cell.

Aspect 14: The method of aspect 13, further comprising: identifying a resource mapping configuration for the physical broadcast channel transmission, wherein the resource mapping configuration is specific to the terrestrial characteristic of the cell.

Aspect 15: The method of aspect 14, wherein the terrestrial characteristic of the cell corresponds to a number of symbols in a subframe or a slot associated with the resource mapping configuration for the physical broadcast channel transmission, the method further comprising: identifying that the cell is associated with a non-terrestrial network based at least in part on the number of symbols in the subframe or the slot being above a threshold number.

Aspect 16: The method of any of aspects 14 through 15, wherein the terrestrial characteristic of the cell corresponds to whether one or more resources of the resource mapping configuration map to a set of one or more starting symbols of a subframe or a slot associated with a control region for terrestrial communications, the method further comprising: identifying that the cell is associated with a non-terrestrial network based at least in part on at least one of the one or more resources of the resource mapping configuration being mapped to the set of one or more starting symbols.

Aspect 17: The method of any of aspects 14 through 16, wherein the terrestrial characteristic of the cell corresponds to whether one or more resources of the resource mapping configuration map to one or more resource elements associated with communicating a cell-specific reference signal in terrestrial communications, the method further comprising: identifying that the cell is associated with a non-terrestrial network based at least in part on at least one of the one or more resources of the resource mapping configuration being mapped to the one or more resource elements.

Aspect 18: The method of any of aspects 13 through 17, further comprising: identifying a scrambling sequence associated with the physical broadcast channel transmission and specific to the terrestrial characteristic of the cell.

Aspect 19: The method of any of aspects 13 through 18, further comprising: identifying one or more time locations of the physical broadcast channel transmission and specific to the terrestrial characteristic of the cell.

Aspect 20: The method of aspect 19, wherein each of the one or more time locations comprises a location of a subframe or a slot within a radio frame specific to the terrestrial characteristic of the cell.

Aspect 21: The method of any of aspects 19 through 20, wherein the one or more time locations of the physical broadcast channel transmission is specific to a duplexing mode for the cell.

Aspect 22: The method of any of aspects 13 through 21, wherein the physical broadcast channel transmission comprises a narrowband physical broadcast channel transmission.

Aspect 23: The method of any of aspects 1 through 22, wherein receiving the broadcast signaling comprises: receiving a master information block transmission that identifies the terrestrial characteristic of the cell.

Aspect 24: The method of aspect 23, wherein the indication of the terrestrial characteristic of the cell corresponds to a bit field of the master information block transmission that indicates the terrestrial characteristic.

Aspect 25: The method of any of aspects 23 through 24, wherein the master information block transmission indicates one out of a set of one or more deployment modes, the deployment modes of the set are specific to the terrestrial characteristic.

Aspect 26: The method of any of aspects 1 through 25, further comprising: determining that the cell is a target for camping by the UE based at least in part on the terrestrial characteristic of the cell; and camping on the cell based at least in part on the determining.

Aspect 27: The method of any of aspects 1 through 26, wherein the terrestrial characteristic indicates whether the cell is associated with a terrestrial network or a non-terrestrial network.

Aspect 28: The method of any of aspects 1 through 27, wherein the cell comprises a narrowband cell (NCell).

Aspect 29: A method for wireless communication at a base station: determining a terrestrial characteristic of a cell associated with the base station; transmitting broadcast signaling associated with the cell, wherein the broadcast signaling identifies the terrestrial characteristic of the cell; and initiating communications with a UE based at least in part on the broadcast signaling identifying the terrestrial characteristic of the cell.

Aspect 30: The method of aspect 29, wherein transmitting the broadcast signaling comprises: transmitting at least one synchronization signal that identifies the terrestrial characteristic of the cell.

Aspect 31: The method of aspect 30, further comprising: identifying a resource mapping configuration for the at least one synchronization signal, wherein the resource mapping configuration is specific to the terrestrial characteristic of the cell, and wherein transmitting the at least one synchronization signal is based at least in part on the determined resource mapping configuration.

Aspect 32: The method of aspect 31, wherein the terrestrial characteristic of the cell corresponds to a number of symbols in a subframe or a slot associated with the resource mapping configuration for the at least one synchronization signal.

Aspect 33: The method of any of aspects 31 through 32, wherein the terrestrial characteristic of the cell corresponds to whether one or more resources of the resource mapping configuration map to a set of one or more starting symbols of a subframe or a slot associated with a control region for terrestrial communications.

Aspect 34: The method of any of aspects 30 through 33, further comprising: identifying at least one of a base sequence, a Zadoff-Chu root, a scrambling sequence, a binary sequence, a cover-code, a cyclic shift associated with the at least one synchronization signal and specific to the terrestrial characteristic of the cell, wherein transmitting the at least one synchronization signal is based at least in part on the determined at least one of the base sequence, the Zadoff-Chu root, the scrambling sequence, the binary sequence, the cover-code, or the cyclic shift.

Aspect 35: The method of any of aspects 30 through 34, further comprising: identifying one or more time locations of the at least one synchronization signal and specific to the terrestrial characteristic of the cell, wherein transmitting the at least one synchronization signal is based at least in part on the determined one or more time locations.

Aspect 36: The method of aspect 35, wherein each of the one or more time locations comprises a location of a subframe or a slot within a radio frame specific to the terrestrial characteristic of the cell.

Aspect 37: The method of aspect 36, wherein the location of the subframe or the slot for each of the one or more time locations comprises an absolute location specific to the terrestrial characteristic of the cell or a relative location among the at least one synchronization signal and specific to the terrestrial characteristic of the cell.

Aspect 38: The method of any of aspects 35 through 37, wherein the one or more time locations of the at least one synchronization signal are specific to a duplexing mode for the cell.

Aspect 39: The method of any of aspects 30 through 38, wherein the at least one synchronization signal comprises a primary synchronization signal, a secondary synchronization signal, or both.

Aspect 40: The method of aspect 39, wherein the primary synchronization signal comprises a narrowband primary synchronization signal, the secondary synchronization signal comprises a narrowband secondary synchronization signal, or both.

Aspect 41: The method of any of aspects 29 through 40, wherein transmitting the broadcast signaling comprises: transmitting a physical broadcast channel transmission that identifies the terrestrial characteristic of the cell.

Aspect 42: The method of aspect 41, further comprising: identifying a resource mapping configuration for the physical broadcast channel transmission, wherein the resource mapping configuration is specific to the terrestrial characteristic of the cell, and wherein transmitting the physical broadcast channel transmission is based at least in part on the determined resource mapping configuration.

Aspect 43: The method of aspect 42, wherein the terrestrial characteristic of the cell corresponds to a number of symbols in a subframe or a slot associated with the resource mapping configuration for the physical broadcast channel transmission.

Aspect 44: The method of any of aspects 42 through 43, wherein the terrestrial characteristic of the cell corresponds to whether one or more resources of the resource mapping configuration map to a set of one or more starting symbols of a subframe or a slot associated with a control region for terrestrial communications.

Aspect 45: The method of any of aspects 42 through 44, wherein the terrestrial characteristic of the cell corresponds to whether one or more resources of the resource mapping configuration map to one or more resource elements associated with communicating a cell-specific reference signal in terrestrial communications.

Aspect 46: The method of any of aspects 41 through 45, further comprising: identifying a scrambling sequence associated with the physical broadcast channel transmission and specific to the terrestrial characteristic of the cell, wherein transmitting the physical broadcast channel transmission is based at least in part on the determined scrambling sequence.

Aspect 47: The method of any of aspects 41 through 46, further comprising: identifying one or more time locations of the physical broadcast channel transmission and specific to the terrestrial characteristic of the cell.

Aspect 48: The method of aspect 47, wherein each of the one or more time locations comprises a location of a subframe or a slot within a radio frame specific to the terrestrial characteristic of the cell.

Aspect 49: The method of any of aspects 47 through 48, wherein the one or more time locations of the physical broadcast channel transmission is specific to a duplexing mode for the cell.

Aspect 50: The method of any of aspects 41 through 49, wherein the physical broadcast channel transmission comprises a narrowband physical broadcast channel transmission.

Aspect 51: The method of any of aspects 29 through 50, wherein transmitting the broadcast signaling comprises: transmitting a master information block transmission that identifies the terrestrial characteristic of the cell.

Aspect 52: The method of aspect 51, wherein the indication of the terrestrial characteristic of the cell corresponds to a bit field of the master information block transmission that indicates the terrestrial characteristic.

Aspect 53: The method of any of aspects 51 through 52, wherein the master information block transmission indicates one out of a set of one or more deployment modes, the deployment modes of the set are specific to the terrestrial characteristic.

Aspect 54: The method of any of aspects 29 through 53, wherein the terrestrial characteristic indicates whether the cell is associated with a terrestrial network or a non-terrestrial network.

Aspect 55: The method of any of aspects 29 through 54, wherein the cell comprises a narrowband cell (NCell).

Aspect 56: An apparatus for wireless communication at a UE, comprising a processor; memory coupled with the processor; and instructions stored in the memory and executable by the processor to cause the apparatus to perform a method of any of aspects 1 through 28.

Aspect 57: An apparatus for wireless communication at a UE, comprising at least one means for performing a method of any of aspects 1 through 28.

Aspect 58: A non-transitory computer-readable medium storing code for wireless communication at a UE, the code comprising instructions executable by a processor to perform a method of any of aspects 1 through 28.

Aspect 59: An apparatus comprising a processor; memory coupled with the processor; and instructions stored in the memory and executable by the processor to cause the apparatus to perform a method of any of aspects 29 through 55.

Aspect 60: An apparatus comprising at least one means for performing a method of any of aspects 29 through 55.

Aspect 61: A non-transitory computer-readable medium storing code the code comprising instructions executable by a processor to perform a method of any of aspects 29 through 55.

Aspect 62: A method for wireless communication at a UE, comprising: performing a synchronization procedure with a cell; and receiving broadcast signaling associated with the cell, wherein the broadcast signaling identifies a terrestrial characteristic of the cell, wherein the terrestrial characteristic indicates whether the cell is associated with a terrestrial network or a non-terrestrial network.

Aspect 63: The method of aspect 62, wherein receiving the broadcast signaling comprises: receiving an information block transmission that identifies the terrestrial characteristic of the cell.

Aspect 64: The method of aspect 63, wherein the indication of the terrestrial characteristic of the cell corresponds to a bit field of the information block transmission that indicates the terrestrial characteristic.

Aspect 65: The method of any of aspects 63 through 64, wherein the information block transmission indicates one out of a set of one or more deployment modes, the deployment modes of the set are specific to the terrestrial characteristic.

Aspect 66: The method of any of aspects 62 through 65, further comprising: identifying a resource mapping configuration for the broadcast signaling, wherein the resource mapping configuration is specific to the terrestrial characteristic of the cell.

Aspect 67: The method of aspect 66, wherein the terrestrial characteristic of the cell corresponds to a number of symbols in a subframe or a slot associated with the resource mapping configuration for the broadcast signaling, the method further comprising: identifying that the cell is associated with a non-terrestrial network based at least in part on the number of symbols in the subframe or the slot being above a threshold number.

Aspect 68: The method of any of aspects 66 through 67, wherein the terrestrial characteristic of the cell corresponds to whether one or more resources of the resource mapping configuration map to a set of one or more starting symbols of a subframe or a slot associated with a control region for terrestrial communications, the method further comprising: identifying that the cell is associated with a non-terrestrial network based at least in part on at least one of the one or more resources of the resource mapping configuration being mapped to the set of one or more starting symbols.

Aspect 69: The method of any of aspects 66 through 68, wherein the terrestrial characteristic of the cell corresponds to whether one or more resources of the resource mapping configuration map to one or more resource elements associated with communicating a cell-specific reference signal in terrestrial communications, the method further comprising: identifying that the cell is associated with a non-terrestrial network based at least in part on at least one of the one or more resources of the resource mapping configuration being mapped to the one or more resource elements.

Aspect 70: The method of any of aspects 62 through 69, further comprising: identifying at least one of a base sequence, a Zadoff-Chu root, a scrambling sequence, a binary sequence, a cover-code, a cyclic shift associated with the broadcast signaling and specific to the terrestrial characteristic of the cell.

Aspect 71: The method of any of aspects 62 through 70, further comprising: identifying one or more time locations of the broadcast signaling and specific to the terrestrial characteristic of the cell.

Aspect 72: The method of aspect 71, wherein each of the one or more time locations comprises a location of a subframe or a slot within a radio frame and specific to the terrestrial characteristic of the cell, the location of the subframe or the slot for each of the one or more time locations comprises an absolute location specific to the terrestrial characteristic of the cell or a relative location among the broadcast signaling and specific to the terrestrial characteristic of the cell.

Aspect 73: The method of any of aspects 71 through 72, wherein the one or more time locations of the broadcast signaling are specific to a duplexing mode for the cell.

Aspect 74: The method of any of aspects 62 through 73, further comprising: determining that the cell is a target for camping by the UE based at least in part on the terrestrial characteristic of the cell; and camping on the cell based at least in part on the determining.

Aspect 75: The method of any of aspects 62 through 74, wherein the cell comprises a narrowband cell (NCell).

Aspect 76: An apparatus for wireless communication at a UE, comprising a processor; memory coupled with the processor; and instructions stored in the memory and executable by the processor to cause the apparatus to perform a method of any of aspects 62 through 75.

Aspect 77: An apparatus for wireless communication at a UE, comprising at least one means for performing a method of any of aspects 62 through 75.

Aspect 78: A non-transitory computer-readable medium storing code for wireless communication at a UE, the code comprising instructions executable by a processor to perform a method of any of aspects 62 through 75.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, as part of a synchronization procedure, broadcast signaling comprising an information block transmission associated with a cell, wherein the information block transmission comprises a bit field that indicates whether the cell is a target for camping for a non-terrestrial network; and
   camping on the cell based at least in part on the information block transmission comprising the bit field that indicates whether the cell is the target for camping for the non-terrestrial network.

2. The method of claim 1, further comprising:
   identifying a resource mapping configuration for the broadcast signaling, wherein the resource mapping configuration is specific to whether the cell is associated with a terrestrial network or the non-terrestrial network.

3. The method of claim 2, wherein whether the cell is associated with the terrestrial network or the non-terrestrial network of the cell corresponds to a number of symbols in a subframe or a slot associated with the resource mapping configuration for the broadcast signaling, the method further comprising:
   identifying that the cell is associated with the non-terrestrial network based at least in part on the number of symbols in the subframe or the slot being above a threshold number.

4. The method of claim 2, wherein whether the cell is associated with the terrestrial network or the non-terrestrial network of the cell corresponds to whether one or more resources of the resource mapping configuration map to a set of one or more starting symbols of a subframe or a slot associated with a control region for terrestrial communications, the method further comprising:
   identifying that the cell is associated with the non-terrestrial network based at least in part on at least one of the one or more resources of the resource mapping configuration being mapped to the set of one or more starting symbols.

5. The method of claim 2, wherein whether the cell is associated with the terrestrial network or the non-terrestrial network corresponds to whether one or more resources of the resource mapping configuration map to one or more resource elements associated with communicating a cell-specific reference signal in terrestrial communications, the method further comprising:
   identifying that the cell is associated with the non-terrestrial network based at least in part on at least one of the one or more resources of the resource mapping configuration being mapped to the one or more resource elements.

6. The method of claim 1, further comprising:
   identifying at least one of a base sequence, a Zadoff-Chu root, a scrambling sequence, a binary sequence, a cover-code, a cyclic shift associated with the broadcast signaling and specific to whether the cell is associated with a terrestrial network or the non-terrestrial network.

7. The method of claim 1, further comprising:
   identifying one or more time locations of the broadcast signaling and specific to whether the cell is associated with a terrestrial network or the non-terrestrial network.

8. The method of claim 7, wherein:
   each of the one or more time locations comprises a location of a subframe or a slot within a radio frame and specific to whether the cell is associated with the terrestrial network or the non-terrestrial network; and
   the location of the subframe or the slot for each of the one or more time locations comprises an absolute location specific to whether the cell is associated with the terrestrial network or the non-terrestrial network or a relative location among the broadcast signaling and specific to whether the cell is associated with the terrestrial network or the non-terrestrial network.

9. The method of claim 7, wherein the one or more time locations of the broadcast signaling are specific to a duplexing mode for the cell.

10. The method of claim 1, further comprising:
determining that the cell is the target for camping by the UE based at least in part on the bit field that indicates whether the cell is the target for camping for the non-terrestrial network; and
camping on the cell based at least in part on the determining.

11. The method of claim 1, wherein the cell comprises a narrowband cell (NCell).

12. The method of claim 1, wherein the information block transmission indicates one out of a set of one or more deployment modes, the one or more deployment modes of the set specific to whether the cell is associated with a terrestrial network or the non-terrestrial network.

13. An apparatus for wireless communication at a user equipment (UE), comprising:
one or more processors;
memory coupled with the one or more processors; and
instructions stored in the memory and executable by the processor one or more processors to cause the apparatus to:
receive, as part of a synchronization procedure, broadcast signaling comprising an information block transmission associated with a cell, wherein the information block transmission comprises a bit field that indicates whether the cell is a target for camping for a non-terrestrial network; and
camp on the cell based at least in part on the information block transmission comprising the bit field that indicates whether the cell is the target for camping for the non-terrestrial network.

14. The apparatus of claim 13, wherein the instructions are further executable by the one or more processors to cause the apparatus to:
identify a resource mapping configuration for the broadcast signaling, wherein the resource mapping configuration is specific to whether the cell is associated with a terrestrial network or the non-terrestrial network.

15. The apparatus of claim 14, wherein whether the cell is associated with the terrestrial network or the non-terrestrial network corresponds to a number of symbols in a subframe or a slot associated with the resource mapping configuration for the broadcast signaling, and the instructions are further executable by the one or more processors to cause the apparatus to:
identify that the cell is associated with the non-terrestrial network based at least in part on the number of symbols in the subframe or the slot being above a threshold number.

16. The apparatus of claim 14, wherein whether the cell is associated with the terrestrial network or the non-terrestrial network corresponds to whether one or more resources of the resource mapping configuration map to a set of one or more starting symbols of a subframe or a slot associated with a control region for terrestrial communications, and the instructions are further executable by the one or more processors to cause the apparatus to:
identify that the cell is associated with the non-terrestrial network based at least in part on at least one of the one or more resources of the resource mapping configuration being mapped to the set of one or more starting symbols.

17. The apparatus of claim 14, wherein whether the cell is associated with the terrestrial network or the non-terrestrial network corresponds to whether one or more resources of the resource mapping configuration map to one or more resource elements associated with communicating a cell-specific reference signal in terrestrial communications, and the instructions are further executable by the one or more processors to cause the apparatus to:
identify that the cell is associated with the non-terrestrial network based at least in part on at least one of the one or more resources of the resource mapping configuration being mapped to the one or more resource elements.

18. The apparatus of claim 13, wherein the instructions are further executable by the one or more processors to cause the apparatus to:
identify at least one of a base sequence, a Zadoff-Chu root, a scrambling sequence, a binary sequence, a cover-code, a cyclic shift associated with the broadcast signaling and specific to whether the cell is associated with a terrestrial network or the non-terrestrial network.

19. The apparatus of claim 13, wherein the instructions are further executable by the one or more processors to cause the apparatus to:
identify one or more time locations of the broadcast signaling and specific to whether the cell is associated with a terrestrial network or the non-terrestrial network.

20. The apparatus of claim 19, wherein:
each of the one or more time locations comprises a location of a subframe or a slot within a radio frame and specific to whether the cell is associated with the terrestrial network or the non-terrestrial network; and
the location of the subframe or the slot for each of the one or more time locations comprises an absolute location specific to whether the cell is associated with the terrestrial network or the non-terrestrial network or a relative location among the broadcast signaling and specific to whether the cell is associated with the terrestrial network or the non-terrestrial network.

21. The apparatus of claim 19, wherein the one or more time locations of the broadcast signaling are specific to a duplexing mode for the cell.

22. The apparatus of claim 13, wherein the instructions are further executable by the one or more processors to cause the apparatus to:
determine that the cell is the target for camping by the UE based at least in part on the bit field that indicates whether the cell is the target for camping for the non-terrestrial network; and
camp on the cell based at least in part on the determining.

23. The apparatus of claim 13, wherein the cell comprises a narrowband cell (NCell).

24. The apparatus of claim 13, wherein the information block transmission indicates one out of a set of one or more deployment modes, the one or more deployment modes of the set specific to whether the cell is associated with a terrestrial network or the non-terrestrial network.

25. An apparatus for wireless communication at a user equipment (UE), comprising:
means for receiving, as part of a synchronization procedure, broadcast signaling comprising an information block transmission associated with a cell, wherein the information block transmission comprises a bit field that indicates whether the cell is a target for camping for a non-terrestrial network; and
means for camping on the cell based at least in part on the information block transmission comprising the bit field that indicates whether the cell is the target for camping for the non-terrestrial network.

26. A non-transitory computer-readable medium storing code for wireless communication at a user equipment (UE), the code comprising instructions executable by one or more processors to:

receive, as part of a synchronization procedure, broadcast signaling comprising an information block transmission associated with a cell, wherein the information block transmission comprises a bit field that indicates whether the cell is a target for camping for a non-terrestrial network; and camp on the cell based at least in part on the information block transmission comprising the bit field that indicates whether the cell is the target for camping for the non-terrestrial network.

* * * * *